(12) United States Patent
Rice

(10) Patent No.: US 11,049,082 B2
(45) Date of Patent: Jun. 29, 2021

(54) SYSTEMS AND METHODS FOR ITEM ACQUISITION BY SELECTION OF A VIRTUAL OBJECT PLACED IN A DIGITAL ENVIRONMENT

(71) Applicant: Robert A. Rice, Raleigh, NC (US)

(72) Inventor: Robert A. Rice, Raleigh, NC (US)

(*) Notice: Subject to any disclaimer, the term of this patent is extended or adjusted under 35 U.S.C. 154(b) by 0 days.

(21) Appl. No.: 16/377,868

(22) Filed: Apr. 8, 2019

(65) Prior Publication Data

US 2019/0311341 A1 Oct. 10, 2019

Related U.S. Application Data

(60) Provisional application No. 62/654,310, filed on Apr. 6, 2018.

(51) Int. Cl.
*G06Q 20/12* (2012.01)
*G06Q 30/02* (2012.01)
*G06Q 30/06* (2012.01)
*H04L 9/06* (2006.01)

(52) U.S. Cl.
CPC ....... *G06Q 20/123* (2013.01); *G06Q 30/0239* (2013.01); *G06Q 30/0643* (2013.01); *H04L 9/0637* (2013.01); *H04L 2209/38* (2013.01)

(58) Field of Classification Search
CPC .............. G06Q 30/0601–0645; G06Q 30/80
USPC ..... 705/26.1, 26.2, 26.25, 26.3, 26.35, 26.4, 705/26.41, 26.42, 26.43, 26.44, 26.5, 705/26.6, 26.61, 26.62, 26.63, 26.64, 705/26.7, 26.8, 26.81, 26.82, 26.9, 27.1, 705/27.2
See application file for complete search history.

(56) References Cited

U.S. PATENT DOCUMENTS

| | | | |
|---|---|---|---|
| 8,606,645 B1* | 12/2013 | Applefeld | G06Q 30/02 705/26.1 |
| 8,698,902 B2* | 4/2014 | Kawamoto | G06T 19/006 348/207.1 |
| 9,443,263 B1* | 9/2016 | Kim | G06Q 30/0241 |
| 9,733,896 B2* | 8/2017 | Yamane | G06F 3/167 |
| 10,163,306 B2* | 12/2018 | Luxton | G07F 17/32 |
| 10,373,431 B2* | 8/2019 | Levi | A63F 13/216 |

(Continued)

OTHER PUBLICATIONS

Searle, S., et al., "E-commerce transactions in a virtual environment: virtual transactions," Electronic Commerce Research, 12.3: 379-407, Springer Nature B.V., Sep. 2012. (Year: 2012).*

(Continued)

*Primary Examiner* — Nicholas D Rosen
(74) *Attorney, Agent, or Firm* — John L. Sotomayor

(57) ABSTRACT

Systems and methods for item acquisition by selection of a virtual object placed in digital environment are disclosed. According to an aspect, a system may include a display, a user interface, an image capture device, and at least one processor and memory. The processor(s) and memory may be configured to receive a coordinate for placement of a virtual object in a digital environment; control the display to display the virtual object when a position corresponding to the received coordinate is within a field of view of the image capture device; receive an input via the user interface for selecting the virtual object; and associate with a user a credit for acquisition of an item associated with the virtual object in response to receipt of the input.

51 Claims, 20 Drawing Sheets

(56) References Cited

U.S. PATENT DOCUMENTS

| | | | | |
|---|---|---|---|---|
| 2012/0075484 A1* | 3/2012 | Kawamoto | ............ | G06T 19/006 |
| | | | | 348/207.1 |
| 2012/0122570 A1* | 5/2012 | Baronoff | ................ | A63F 13/52 |
| | | | | 463/31 |
| 2014/0058825 A1* | 2/2014 | Raman | .................. | G06Q 30/02 |
| | | | | 705/14.42 |
| 2015/0070714 A1* | 3/2015 | Sadasue | ................ | G06T 19/006 |
| | | | | 358/1.2 |
| 2015/0254511 A1* | 9/2015 | Yamane | ................. | G06F 3/167 |
| | | | | 345/633 |
| 2017/0140408 A1* | 5/2017 | Wuehler | ............. | G06Q 30/0207 |
| 2017/0193749 A1* | 7/2017 | Levi | ....................... | G06Q 50/01 |
| 2017/0309129 A1* | 10/2017 | Luxton | ............... | G07F 17/3272 |
| 2018/0321776 A1* | 11/2018 | Averyanov | .............. | G06F 3/048 |

OTHER PUBLICATIONS

Hsu, C., et al., "HoloTabletop: an anamorphic illusion interactive Holographic-like tabletop system," Multimedia Tools and Applications, 76.7: 9245-9264, Springer Nature B.V., Apr. 2017. (Year: 2017).*

International Search Report and Written Opinion dated Jul. 5, 2019 from related PCT Application No. PCT/US19/26317 (eighteen (18) pages).

* cited by examiner

Example 7: Cross-Platform, Virtual World, Virtual Reality, Game, etc.

Example 9: Trade, Transfer, Sale

Example 19

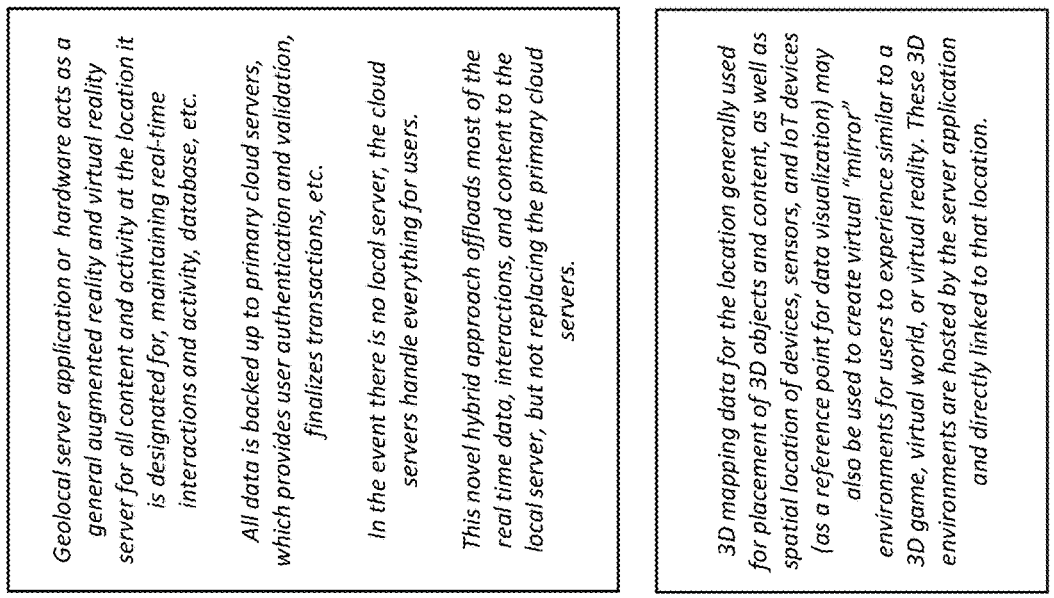
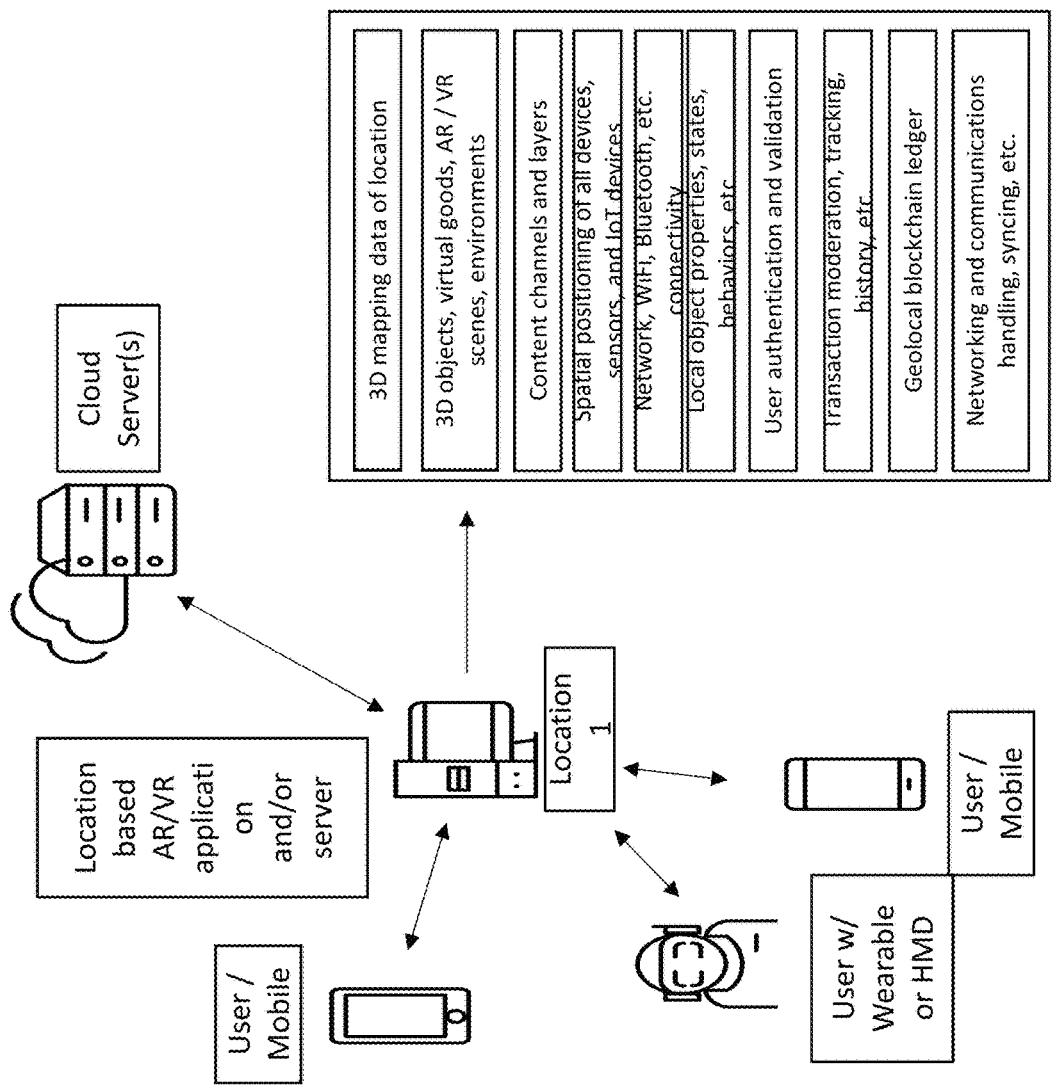
FIG. 15 Example 20

Example 22

Example 24

Example 25

SYSTEMS AND METHODS FOR ITEM ACQUISITION BY SELECTION OF A VIRTUAL OBJECT PLACED IN A DIGITAL ENVIRONMENT

CROSS REFERENCE TO RELATED APPLICATION

This application claims priority to U.S. Provisional Patent Application No. 62/654,310, filed Apr. 6, 2018, and titled SYSTEMS AND METHODS FOR ITEM ACQUISITION BY SELECTION OF A VIRTUAL OBJECT PLACED IN A DIGITAL ENVIRONMENT, the content of which is incorporated herein by reference in its entirety.

TECHNICAL FIELD

The present disclosure relates to systems and methods for item acquisition by selection of a virtual object placed in a digital environment.

BACKGROUND

Various techniques are used for advertising and providing promotions by use of electronic devices. For example, television utilizes commercials that are interspersed through content, such as television shows and movies, for advertising goods and services. More recently, advertisements are presented to consumers via the Internet. For example, websites provide "clickable" ads through which a user may be directed to a website of a company providing services or goods. In addition, advertisements are often provide through video-sharing websites, such as YouTube. There is a continuing need to provide companies with improved techniques for advertising and providing promotions via electronic devices.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Disclosed herein are systems and methods for item acquisition by selection of a virtual object placed in digital environment. According to an aspect, a system may include a display, a user interface, an image capture device, and at least one processor and memory. The processor(s) and memory may be configured to receive a coordinate for placement of a virtual object in a digital environment. The processor(s) and memory may also control the display to display the virtual object when a position corresponding to the received coordinate is within a field of view of the image capture device. Further, the processor(s) and memory may receive an input via the user interface for selecting the virtual object. The processor(s) and memory may also associate with a user a credit for transaction or transfer in response to receipt of the input.

According to another aspect, a system may include a computing device comprising a communications module configured to communicate with other computing devices via a network. The computing device may also include an augmented reality manager configured to maintain a database that identifies a plurality of virtual objects and a coordinate of each of the virtual objects in a digital environment. Further, the augmented reality manager may associate, for each virtual object, a credit for transaction or transfer. The augmented reality manager may also use the communications module to communicate, to the other computing devices via the network, identification of at least one virtual object and the coordinate of the at least one virtual object.

BRIEF DESCRIPTION OF THE DRAWINGS

The foregoing summary, as well as the following detailed description of preferred embodiments, is better understood when read in conjunction with the appended drawings. For the purposes of illustration, there is shown in the drawings exemplary embodiments; however, the present disclosure is not limited to the specific methods and instrumentalities disclosed. In the drawings:

FIG. 15 is a diagram showing an example distributed and decentralized architecture according to embodiments of the present disclosure;

DETAILED DESCRIPTION

Figure 1:
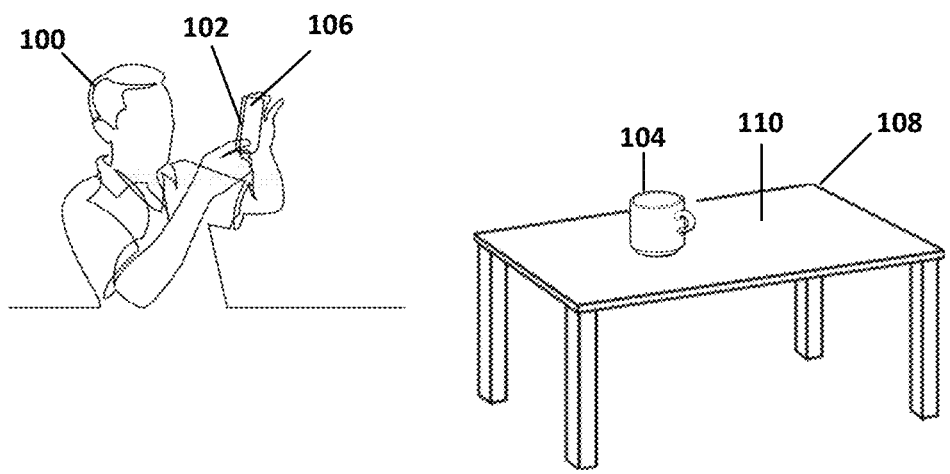
FIG. 1 is a view of a person holding a smartphone for viewing a virtual object 104 within a digital environment and for user in acquiring an item associated with the virtual object in accordance with embodiments of the present disclosure.

The present disclosure is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

As referred to herein, the term "computing device" should be broadly construed. It can include any type of mobile device, for example, a smartphone, a smart watch, a cell phone, a pager, a personal digital assistant (PDA, e.g., with GPRS NIC), a mobile computer with a smart phone client, or the like. A computing device can also include any type of conventional computer, for example, a desktop computer, a laptop computer, a netbook computer, a notebook computer, a server, or the like. A typical mobile device is a wireless data access-enabled device (e.g., an iPHONE® smart phone, a BLACKBERRY® smart phone, a NEXUS ONE™ smart phone, iPAD® device, an ANDROID compatible device, a SAMSUNG® device (e.g., SAMSUNG GALAXY® smart phone), a or the like) that is capable of sending and receiving data in a wireless manner using protocols like the Internet Protocol, or IP, and the wireless application protocol, or WAP. This allows users to access information via wireless devices, such as smart phones, mobile phones, pagers, two-way radios, communicators, and the like. Wireless data access is supported by many wireless networks, including, but not limited to, CDPD, CDMA, GSM, PDC, PHS, TDMA, FLEX, ReFLEX, iDEN, TETRA, DECT, DataTAC, Mobitex, EDGE and other 2G, 3G, 4G, 5G, and LTE technologies, and it operates with many handheld device operating systems, such as PalmOS, EPOC, Windows CE, FLEXOS, OS/9, JavaOS, iOS and Android. Typically, these devices use graphical displays and can access the Internet (or other communications network) on so-called mini- or micro-browsers (which are web browsers with small file sizes that can accommodate the reduced memory constraints of wireless networks), on other client applications accessed via the graphical displays, on client applications that do not utilize a graphical display, or the like. In a representative embodiment, the mobile device is a cellular telephone or smart phone that operates over GPRS (General Packet Radio Services), which is a data technology for GSM networks. In addition to a conventional voice communication, a given mobile device can communicate with another such device via many different types of message transfer techniques, including SMS (short message service), enhanced SMS (EMS), multi-media message (MMS), email WAP, paging, or other known or later-developed wireless data formats. Although many of the examples provided herein are implemented on a mobile device, the examples may similarly be implemented on any suitable computing device. Computing devices may include wearable devices having displays and/or other user interfaces.

As referred to herein, a "user interface" is generally a system by which users interact with a computing device. A user interface can include an input for allowing users to manipulate a computing device, and can include an output for allowing the system to present information and/or data, indicate the effects of the user's manipulation, etc. An example of a user interface on a computing device (e.g., a mobile device) includes a graphical user interface (GUI) that allows users to interact with programs in more ways than typing. A GUI typically can offer display objects, and visual indicators, as opposed to text-based interfaces, typed command labels or text navigation to represent information and actions available to a user. For example, a user interface can be a display window or display object, which is selectable by a user of a mobile device for interaction. The display object can be displayed on a display screen of a mobile device and can be selected by, and interacted with by, a user using the user interface. In an example, the display of the mobile device can be a touch screen, which can display the display icon. The user can depress the area of the display screen at which the display icon is displayed for selecting the display icon. In another example, the user can use any other suitable interface of a mobile device, such as a keypad, to select the display icon or display object. For example, the user can use a track ball or arrow keys for moving a cursor to highlight and select the display object.

User interfaces and GUIs may be affected by interaction with sensor devices, wearables, or computer vision interfaces (i.e. the user's motion is tracked by a device using computer vision techniques as the way to interact with the interface. For example, a person may wave his or her hand in front of an automatic door, and the sensor picks up the movement and triggers the door opening. In similar fashion, some advanced AR and VR interfaces may track the fingers, hands, arms of the user for interaction, without needing other interfaces like keyboards, mice, or handheld/wearable devices or pointers.

As referred to herein, a "communication channel" is any suitable type of connection between computing devices in which data may be exchanged. For example, a communication channel may be established between computing devices via a telephone call, an email communication, a text message communication, an instant message communication, and the like.

Operating environments in which embodiments of the present disclosure may be implemented are also well-known. In a representative embodiment, a computing device, such as a mobile device, is connectable (for example, via WAP) to a transmission functionality that varies depending on implementation. Thus, for example, where the operating environment is a wide area wireless network (e.g., a 2.5G network, a 3G network, or a 4G network), the transmission functionality comprises one or more components such as a mobile switching center (MSC) (an enhanced ISDN switch that is responsible for call handling of mobile subscribers), a visitor location register (VLR) (an intelligent database that stores on a temporary basis data required to handle calls set up or received by mobile devices registered with the VLR), a home location register (HLR) (an intelligent database responsible for management of each subscriber's records), one or more base stations (which provide radio coverage with a cell), a base station controller (BSC) (a switch that acts as a local concentrator of traffic and provides local switching to effect handover between base stations), and a packet control unit (PCU) (a device that separates data traffic coming from a mobile device). The HLR also controls certain services associated with incoming calls. Of course, the present disclosure may be implemented in other and next-generation mobile networks and devices as well. The mobile device is the physical equipment used by the end user, typically a subscriber to the wireless network. Typically, a mobile device is a 2.5G-compliant device, a 3G-compliant device, or a 4G-compliant device that includes a subscriber identity module (SIM), which is a smart card that carries subscriber-specific information, mobile equipment (e.g., radio and associated signal processing devices), a user interface (or a man-machine interface (MMI)), and one or more interfaces to external devices (e.g., computers, PDAs, and the like). The mobile device may also include a memory or data store.

The presently disclosed subject matter is now described in more detail. For example, FIG. 1 illustrates a view of a person 100 holding a smartphone 102 for viewing a virtual object 104 within a digital environment and for use in acquiring an item associated with the virtual object 104 in accordance with embodiments of the present disclosure. Referring to FIG. 1, the virtual object 104 can be viewed by the person 100 when displayed by a display 106 of the smartphone 102 in accordance with a suitable augmented reality technique. For example, the smartphone 102 may be configured to capture an image or video of a table 108 in the real world and to recognize a top surface 110 of the table 108. The smartphone 102 may subsequently overlay an image of the virtual object 104 on the captured image or video such that it appears that the virtual object 104 is placed on the surface 110. In this example, the virtual object 104 is a virtual coffee cup but may alternatively be any other type of virtual object. The virtual object 104 may be a visual representation of the item.

In operation in accordance with embodiments of the present disclosure, the smartphone 102 may receive a coordinate for placement of the virtual object 104 in the digital environment shown in FIG. 1. For example, a server may communicate the coordinate to the smartphone 102 via a cellular connection, WI-FI® wireless connection, and/or other suitable wireless connection. The smartphone 102 may also receive information about display of the virtual object 104. The smartphone 102 may be configured to control the display 102 to display the virtual object 104 when a position corresponding to the received coordinate is within a field of view of a camera of the smartphone 102.

Continuing the example, the smartphone 102 may also be configured to receive an input via a user interface of the smartphone 102 for selecting the displayed virtual object 104. For example, the person 100 may touch the display screen 106 where the virtual object 104 is displayed for selecting the virtual object 104. The smartphone 102 may subsequently associate with the person 100 or user of the smartphone 102 a credit for transaction or transfer in response to receipt of the input. For example, the credit may be used for acquisition of an item associated with the virtual object. For example, the smartphone 102 may store account information of the user for a coffee shop. The person 100 may apply the credit for a free or discounted coffee at the coffee shop by suitable presentation of the credit at the coffee shop.

In another example, the credit acquired by a user at one computing device may be transferred to another user at another computing device. For example, the user of one computing device may use an application (or "app") to identify the other user and to order the transfer of the acquired credit to the other computing device. The user at the other computing device may, upon receipt of the credit, use the credit for obtaining an item, such as the aforementioned free or discounted coffee.

In another example, the credit may be used for a transaction other than for acquiring an item. For instance, the credit may be used for providing to the user access to content (e.g., a video, images, or music), access to an event (e.g., a movie or concert), or the like.

Figure 2:
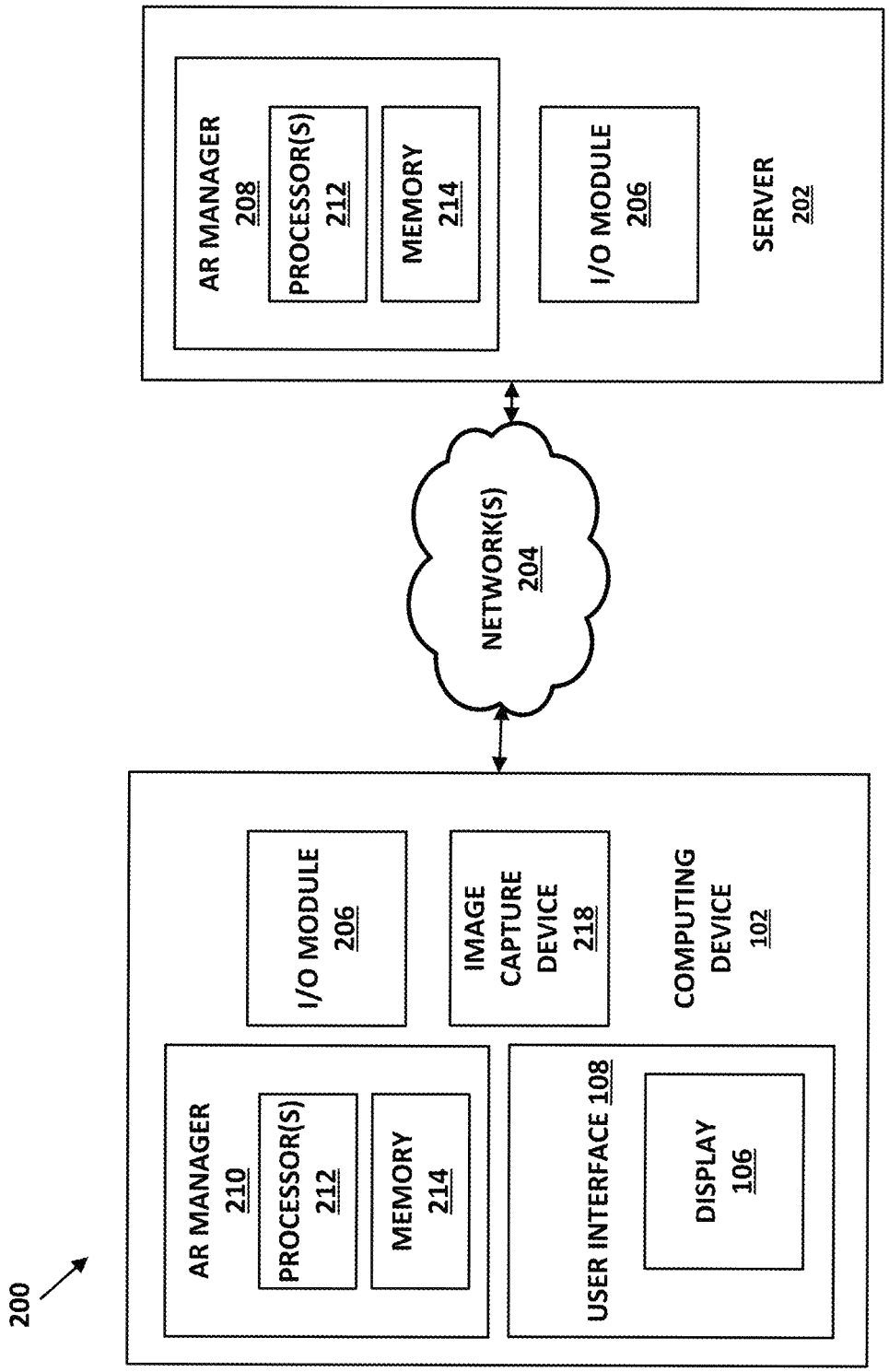
FIG. 2 is a block diagram of an example system for item acquisition by selection of a virtual object placed in a digital environment in accordance with embodiments of the present disclosure.

FIG. 2 is a block diagram of an example system 200 for item acquisition by selection of a virtual object placed in a digital environment in accordance with embodiments of the present disclosure. Referring to FIG. 2, the system 200 includes a server 202, which may be any type of computing device capable of communicating via one or more networks 204 (e.g., the Internet, wired networks, wireless networks, and the like). Particularly, the server 202 includes an input/output (I/O) module 206 or any other suitable communication interface configured to communicate with the network 204 and any devices communicatively connected thereto. The server 202 includes a number of functional components. This representation of the server 202 is meant to be for convenience of illustration and description, and it should not be taken to limit the scope of the present disclosure as one or more functions may be combined. Typically, these components are implemented in software (as a set of process-executable computer instructions, associated data structures, and the like). One or more of the functions may be combined or otherwise implemented in any suitable manner (e.g., in hardware, in firmware, in combined hardware and software, or the like). The server 202 is Internet-accessible and can interact with other computing devices via known Internet protocols such as HTTP, HTTPS, and the like. The server 202 is shown as a single device but this is not a requirement; one or more programs, processes, or other code may comprise the server and be executed on one or more servers and/or other machines in one or more networked locations.

The server 202 includes an augmented reality (AR) manager 208 configured to implement functionality for providing an AR environment for users of computing device, such as computing device 102. For example, the AR manager 208 may store coordinates for placement of one or more virtual objects in a digital environment. The I/O module 206 of the server 202 may communicate the coordinate for a virtual object to the computing device 102. The I/O module 206 of the computing device 102 may receive the coordinate of the virtual object. Also, the AR manager 208 may store information about how to graphically represent the virtual object. The information about how to graphically represent the virtual object may be communicated to the computing device 102. The coordinate and graphics information may be received by an AR manager 210 of the computing device 102.

The AR manager 210 of the computing device 102 may be implemented by hardware, software, firmware, or combinations thereof. In this example, the AR manager 210 of the computing device 102 is implemented by one or more processors 212 and memory 214. The AR manager 210 may determine one or more coordinates of an area or space within the field of view of an image capture device 218 of the computing device 102. Further, the AR manager 210 may compare these determined coordinate(s) to the received coordinate corresponding to the virtual object to determine if the coordinates match or nearly match. The AR manager 210 may control a display 106 of a user interface 216 to display the virtual object when a position corresponding to the received coordinate is within a field of view of the image capture device 218. The virtual object may be displayed on the display at a location corresponding to the received coordinate of the virtual object. The image capture device 218 may be a video camera or still camera configured to capture video of images within its field of view.

During display of the virtual object, the user may use the user interface 216 to select the virtual object. For example, the display 106 may be a touchscreen display, and the user may touch the place on the display's 106 surface where the virtual object is displayed for selecting the virtual object. Alternatively, the user may select the virtual object by use of the user interface 216 in any other suitable manner. The AR manager 210 may receive the input via the user interface 216 for selecting the virtual object. Subsequently, the AR manager 210 may associate with the user a credit for acquisition of an item associated with the virtual object. For example, the AR manager 210 may store a credit in memory 214 for later use and access by the user to use for transaction or transfer. Examples uses for credits include, but are not limited to, exchange for an object, a service, an offer, and the like. The credit, once received, may alternatively or additionally be stored in any other suitable memory location such as at the server or another computing device.

In accordance with embodiments, the computing device 102 may receive a unique identifier upon selection of the virtual object. The computing device 102 may use the unique identifier to conduct a transaction for acquisition of the item. For example, the AR manager 210 of the computing device 102 may send to the server 202 a notification of selection of the virtual object. The server 202 may send a unique identifier to the computing device 102 in response to receipt of the notification. The computing device 102 may use the unique identifier to purchase an item. For example, the unique identifier may be the credit that can be used by the computing device for conducting a purchase transaction for an item in exchange for the redeemable credit. The purchase transaction may be at a store or online.

In accordance with embodiments, the server 202 may maintain a database that associates multiple virtual objects or items with different coordinates. The database may be stored in a memory of the server 202 or otherwise be accessible by the server 202. The server 202 may manage the distribution of the virtual objects and their respective coordinates among computing devices via the network(s) 204. For example, the server 202 may communicate the virtual objects and their coordinates to the computing device 102. Although only computing device 102 is shown in FIG. 2, it should be understood that there may be many computing devices that receive the same virtual items and coordinates.

In accordance with embodiments, the server 202 may determine that a credit has been used for acquisition of the item associated with a virtual object or another transaction. The server 202 may subsequently update its database to remove the virtual object from the digital environment in response to determining that the credit has been used for acquisition of the item or another transaction. For example, the server 202 may receive notification that a user of the computing device 102 has used a credit to acquire an item in a purchase transaction. The server 202 may subsequently update its database to remove the virtual object and also notify or otherwise indicate to computing devices that the virtual object has been removed. As a result, the computing devices are configured to no longer display the virtual object as a result of the virtual object being removed.

In accordance with embodiments, the computing device 102 may utilize a blockchain technique for managing the virtual object and its associated data. Blockchain or blockchain database may he used in one or more configurations (e.g., private, public, single, federated cluster, sharded, or fully decentralized) to track history and changes of virtual object location, properties, ownership, and more. This may include implementations that are location specific with one or more servers acting in a federated manner providing consensus verification using multiple private or public blockchains, or other implementations with one or more regional or global blockchains. Each action, transaction, or activity related to an individual virtual object or multiple virtual objects, which include but are not limited to, generation, discovery, acquisition, sharing, trading, redemption, or change in object properties, location, ownership, or use can be recorded on one or more blockchains as well as updated in one or more databases or other storage medium.

Figure 3:
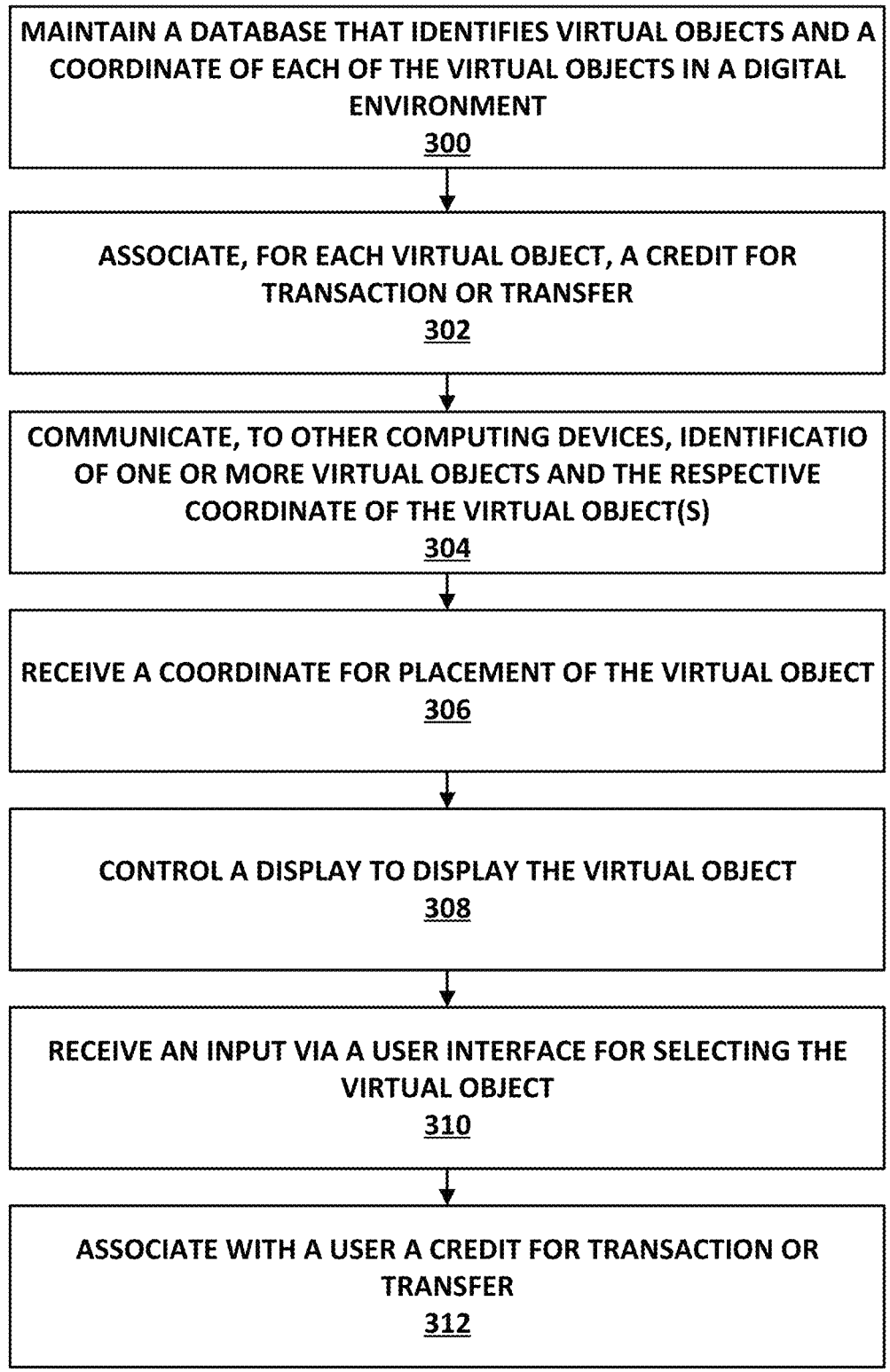
FIG. 3 is a flow chart of an example method for item acquisition by selection of a virtual object placed in a digital environment in accordance with embodiments of the present disclosure.

FIG. 3 illustrates a flow chart of an example method for item acquisition by selection of a virtual object placed in a digital environment in accordance with embodiments of the present disclosure. The method is described as being implemented by the system 200 shown in FIG. 2, but it should be understood that the method may be implemented by any suitable system. The computing devices in the system may be configured to implement an AR environment for its users.

Referring to FIG. 3, the method includes maintaining 300 a database that identifies virtual objects and a coordinate of each of the virtual objects in a digital environment. For example, the server 202 shown in FIG. 2 may maintain such a database. The database may include identification of various virtual objects and a coordinate of each virtual object in the digital environment. The database may also store information or instructions about how to display the virtual object.

The method of FIG. 3 includes associating 302, for each virtual object, a credit for acquisition of an item associated with the virtual object. Continuing the aforementioned example, the server 102 may associate, each virtual object stored in its database, a unique credit for use in acquiring an item associated with its respective virtual object or another transaction.

The method of FIG. 3 includes communicating 304, to other computing devices, identification of one or more virtual objects and the respective coordinate of the virtual object(s). Continuing the aforementioned example, the server 202 may use its I/O module 206 to communicate to the computing device 102, via the network(s) 204, identification of one or more virtual objects and the coordinate of each virtual object. The computing device 102 may receive the data via its I/O module 206 and store the data in memory 214.

The method of FIG. 3 includes receiving 306 a coordinate for placement of a virtual object in a digital environment. Continuing the aforementioned example, the computing device 102 may receive a coordinate for placement of a virtual object from the server 202. The computing device 102 may also receive information about how to visually display the virtual object. The AR manager 210 of the computing device 102 may store the coordinate and information about how to display the virtual object in memory 214.

The method of FIG. 3 includes controlling 308 a display to display the virtual object when a position corresponding to the received coordinate is within a field of view of an image capture device. Continuing the aforementioned example, the AR manager 210 can control the display 106 to display the virtual object when a position corresponding the received coordinate is within a field of view of the image capture device 218.

The method of FIG. 3 includes receiving 310 an input via a user interface for selecting the virtual object. Continuing the aforementioned example, the user may select the displayed virtual object, and the AR manager 210 may receive the input via the user interface 216 for selecting the virtual object. Subsequently, the method includes associating 312 with a user a credit for transaction or transfer in response to receipt of the input. For example, the AR manager 210 may associate with the user of the computing device 102 a credit for acquisition of an item in accordance with examples provided herein.

It is noted that a virtual object may be a 3D object or any suitable type of digital media (e.g., video, audio, banners, 2D, etc.). A virtual object may be accessible, viewable, discoverable, and/or interactive in augmented reality, virtual reality, or 3D environment or world, which may also be a virtual goods object. Virtual goods objects may be virtual objects that are linked to or representative of an object, service, offer, goods, or merchandise in the real-world, which can also be exchanged, activated, redeemed, or otherwise converted into access or ownership of the real-world object, or used as proof of rights, access, or ownership. In accordance with embodiments, each of these virtual goods objects ("virtual goods") are unique and transferable, and different from other virtual objects that are not linked to real-world items, assets, offers, services, goods, merchandise, etc. Virtual objects may be identical in nearly all aspects, except that each is a unique instance (in the database), even though they may have identical appearances, properties, and behaviors. Each may have a unique identifier (e.g., a key ID or hash). The virtual objects may be "smart" objects in that they are unique, instead of just visual copies of the same 3D object ("dumb" instances), and their unique identifiers are part of the object. If they are transferred from one user to another, even across different platforms or applications, they may still be tracked and can be exchanged or redeemed as disclosed herein.

Example 1: Virtual Object—Virtual Goods—(Coffee)

Figure 4:
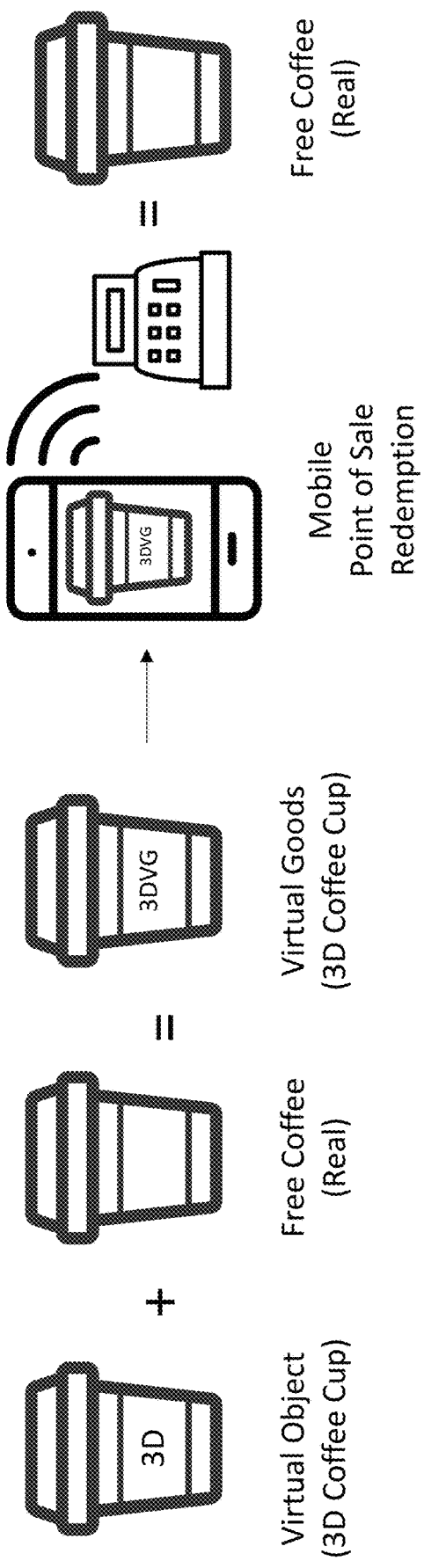
FIG. 4 is a diagram depicting steps for obtaining coffee in exchange for acquisition of a virtual object in accordance with embodiments of the present disclosure.

In one example, FIG. 4 illustrates a diagram depicting steps for obtaining coffee in exchange for acquisition of a virtual object in accordance with embodiments of the present disclosure. Referring to FIG. 4, the figure depicts a user discovering a 3D coffee cup (virtual object) using an augmented reality application, which has been linked to a free cup of coffee, now making it a 3D virtual goods virtual object. The user collects the 3D coffee cup, goes to a local café running a promotion, and redeems the virtual goods at the point of sale in exchange for a real cup of coffee. The method of redemption may vary depending on the merchant's point of sale system, but could be based on scanning a barcode, QR code, or other method. When redeemed, the virtual goods virtual object is then removed from the user's inventory completely, or replaced with a generic 3D coffee cup that no longer has virtual goods properties associated with it.

Example 2: Virtual Object Virtual Goods—Sneaker

In another example, a sneaker object (such as a 3D model of a pair of sneakers) may be activated, redeemed, or exchanged at a retail location or online for a pair of real sneakers (merchandise), or in exchange for a special offer (buy one get one free) or a discount (redeem or exchange the 3D sneaker object in exchange for a 10% discount on your next purchase of real world sneakers that have matching model, color, size, brand, etc.).

Each virtual object can have certain data and information embedded into the data file, database entry, and/or within the metadata for the specific object identifying it as a unique object and virtual good. When the object is used, activated, is traded (change of ownership), modified, or the like, the changes are reflected in the object data file, which may include in one or more blockchains, providing a record of its current and past state/behaviors, and so forth. Unique smart virtual objects cannot be copied and can only exist in one place or location (real or virtual) at any time.

Creation and Distribution

In accordance with embodiments of the present disclosure, creation of virtual objects and virtual goods may be done manually or automatically, depending on the implementation of the technology. These include, but are not limited to:

a) Using a software application or web interface to create a virtual goods object, define its properties, link it to real-world items, and then publish or activate it, making it available to users that meet one or more requirements or conduct any kind of activity; and b) Programmatically, with a computing device or server application or script that creates virtual objects with varying properties, behaviors, 3D objects, animations, and textures.

These virtual objects and virtual goods can be distributed manually, such as determining the location of where or how the object(s) can be discovered and found; distributed automatically through a system that either randomly determines its location and accessibility; or in a way that follows a methodology or set of conditions that determine when and where the objects are published or activated.

Virtual objects and those enabled as virtual goods may be located in real-world locations; placed in 2D and 3D games; distributed in 3D environments, virtual worlds, or virtual reality experiences; or associated with an image or object in the real world (e.g., a picture, poster, logo, sign, graphic, Eiffel Tower, etc.). In addition, each of these locations, objects, or images can have one or more virtual objects or virtual goods associated with them.

Example 3: Virtual Object—Virtual Goods Creation and Distribution

A user logs into an application or web interface and creates a new object instance in the database with varying properties, behaviors, 3D object, animation, textures, and the like. This may be done from scratch or based on a previously created template. The new instance is subsequently used to create one or more virtual objects that can then be linked to real world images or objects, each with a unique code or identifier used to reference the real-world object. These identifiers include but are not limited to hashIDs, alphanumeric strings, code snippet, bar code, QR code, etc.

Figure 5:
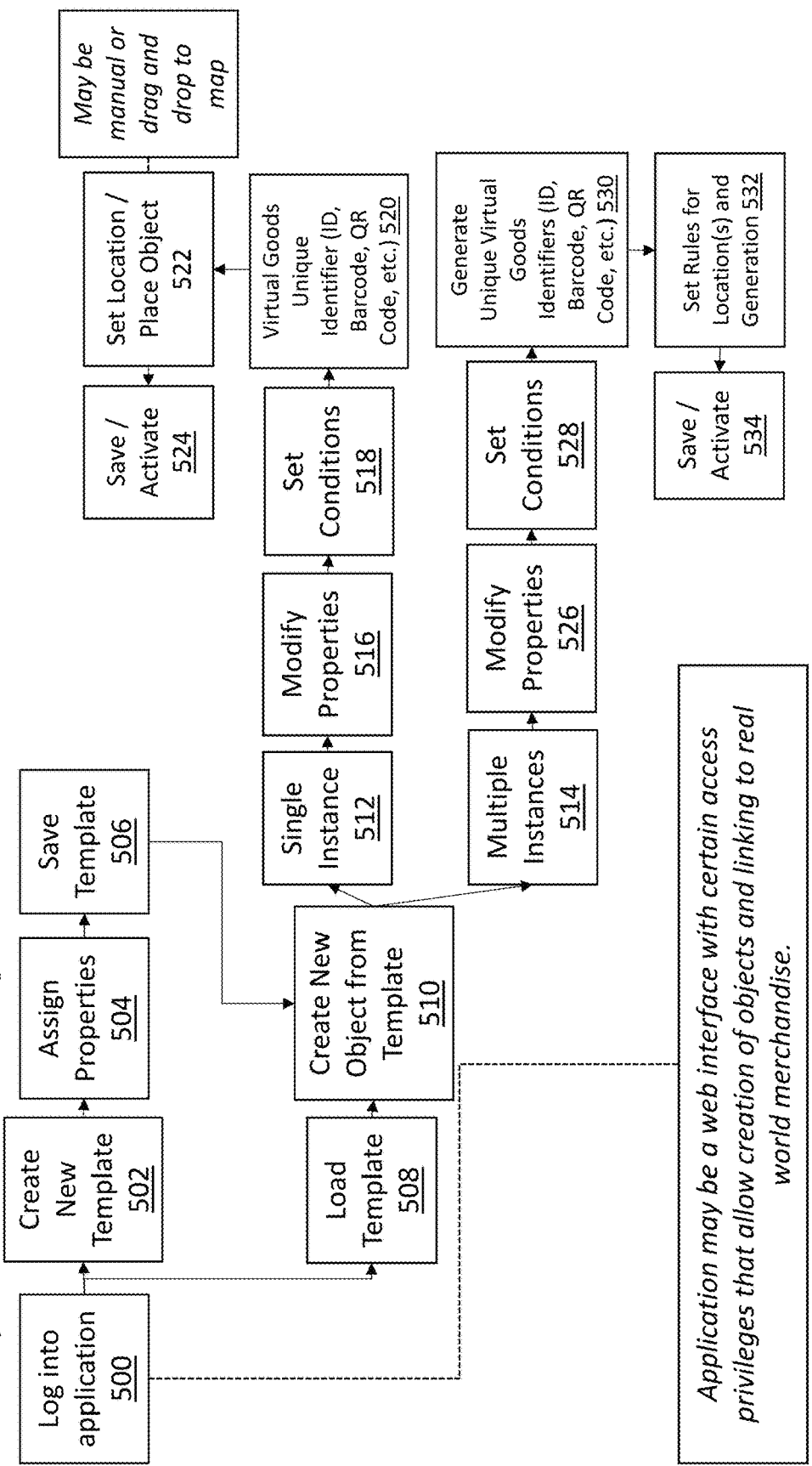
FIG. 5 is a flow diagram of an example method of virtual goods creation and distribution according to embodiments of the present disclosure.

FIG. 5 illustrates a flow diagram of an example method of virtual goods creation and distribution according to embodiments of the present disclosure. The method of FIG. 5 may be implemented by any suitable computing device, such as a server. For example, the method may be implemented by the AR manager 208 of the server 202 shown in FIG. 2.

Referring to FIG. 5, the method includes logging 500 into an application, creating 502 a new template, assign 504 properties, and saving 506 the template.

The method of FIG. 5 also includes loading 508 a template and creating 510 a new object from the template.

Subsequent to creating of an object from the template, the method of FIG. 5 may either create 512 a single instance of the object, or create 514 multiple instances of the object. Turning first to creating 512 a single instance of the object, the method may subsequently modify 516 properties and set 518 conditions. Further, a virtual good unique identifier may be provided 520. A location or place for the object may be set 522. Subsequently, these setting for the object may be saved or activated 524. In an example, the object may be manually dragged or dropped to a map for setting the object's location.

Now turning to the option of creating 514 multiple instances of the object, the method may subsequently modify 526 properties and set 528 conditions. Further, the method includes generating 530 unites virtual good identifiers for the multiple instances. The method also includes setting 532 rules for location(s) and generation. Subsequently, these setting for the object may be saved or activated 534.

Subsequent to the steps of activating 524 and 534, objects are discoverable by users, or the objects may be generated when predetermined conditions are met.

Example 4: Programmatical Generation

In an example, a software application or a script may be used to programmatically create new objects based on templates, and automatically assigned unique identifiers from a list or database of such identifiers. This example method can be useful for bulk object creation, or when a high number of similar objects need to be created. For example, a user with appropriate account privileges creates 1,000 virtual goods objects (3D coffee cups), of which it is determined that 100 can be generated per week over a ten week period, randomly spawning at one or more designated locations, based on other set conditions (no more than one per hour per location, but not on Sundays).

Example 5: Association with Images, Codes, Objects, Etc. With Conditionals

Figure 6:
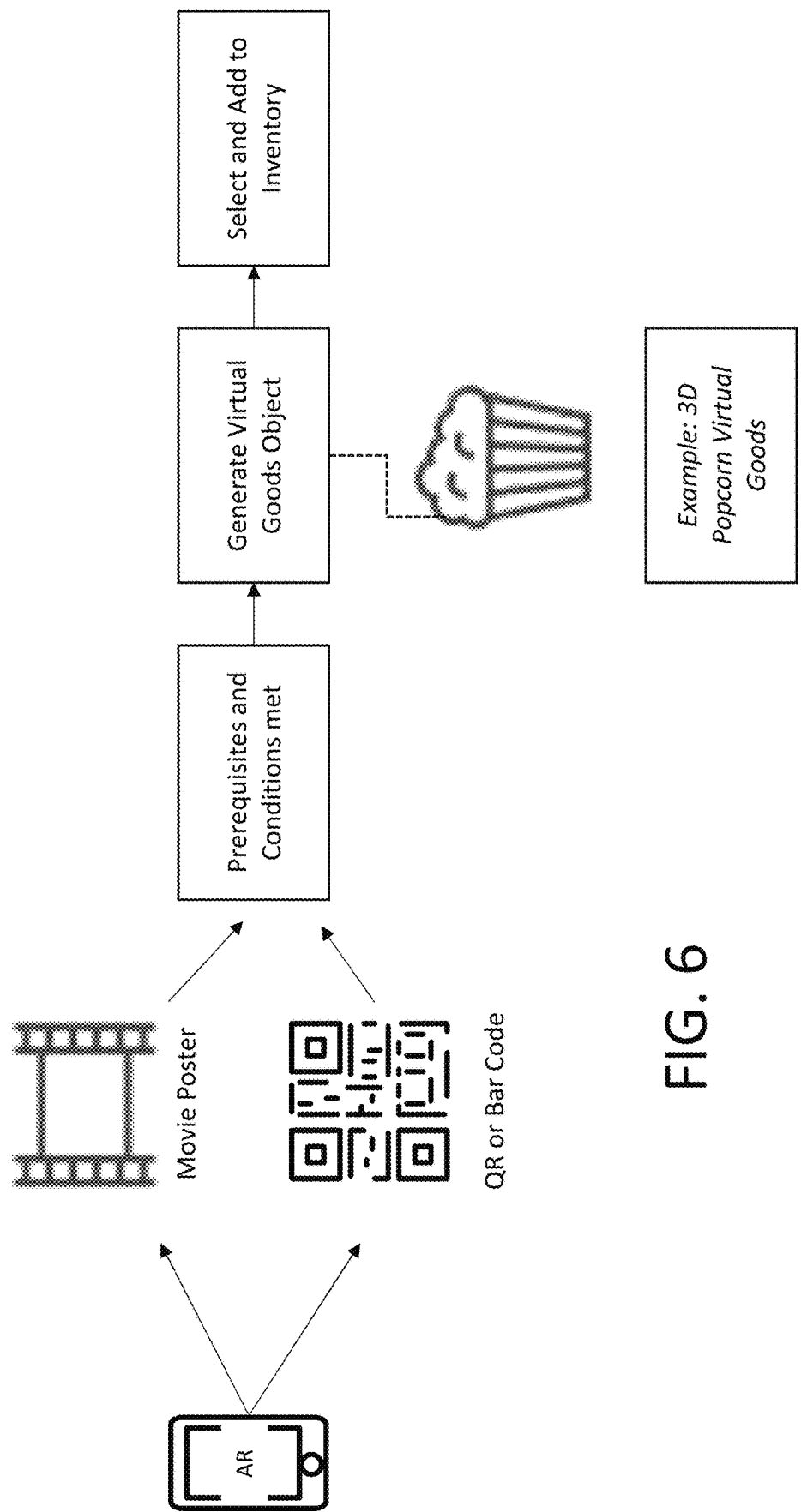
FIG. 6 is a flow diagram of an example method for associating images, codes and objects with conditionals according to embodiments of the present disclosure.

In an example, virtual goods objects can be associated with certain images (such as logos, pictures, or objects) that are recognized by image recognition or computer vision scanning (including bar codes, QR codes, product packaging, billboards, posters, nametags, etc.). In one implementation, a virtual goods object may be associated with a logo or graphic on the side of a cereal box. In another implementation, the virtual goods object can be associated and linked to a movie poster. The application may use computer vision techniques for scanning and image recognition to trigger the generation of the virtual goods object from the image, and other conditional requirements may be met. Conditionals may include, but are not limited to time, date, location, the like, or other prerequisites (such as having other designated virtual objects or virtual goods in the user inventory). In this case, scanning a movie poster at one location may generate a virtual goods object, which may not be generated at a different location, or a completely different virtual goods object may be generated. FIG. 6 illustrates a flow diagram of an example method for associating images, codes and objects with conditionals according to embodiments of the present disclosure.

Discovery and Acquisition

Virtual objects and virtual goods objects may be acquired through a purchase from a marketplace; discoverable and acquired through using an augmented reality application or application used to access or display a 3D environment or world (these 3D worlds may or may not be virtual reality enabled); or received as part of a sale or trade transaction between two or more individuals; or received as a gift or reward for some other activity (such as "checking in" to a location, solving a puzzle or completing one or more tasks, completing some other transaction (like a purchase at a store or e-commerce), or as a prize in a contest. These virtual objects and virtual goods may be part of other objects or hidden in object containers (typically represented as a box, treasure chest, gift box, etc.), or created after the completion of a task or activity.

Example 6: Augmented Reality

User opens augmented reality application on a device, such as a smartphone or a tablet. The location of the user and device is determined using one or more methods including but not limited to GPS, WI-FI® triangulation, BLUETOOTH™, cellular, scanning a hardware device such as RFID or a beacon, querying a local augmented reality server or dedicated device, or selecting from a list of nearby locations on the app. Alternatively, computer vision techniques for image or object recognition can be used to locate and render the virtual object or virtual goods. The difference from standard augmented reality uses (GPS geolocated and or image/object recognition) is that these objects are collectible, transferable, and can be redeemed or exchanged for other objects or real-world goods or services.

In accordance with embodiments, an application may have a map view that shows nearby AR content, objects, people etc., as well as a "live" view which is a video feed from the device camera, upon which is overlaid a user interface and graphics that indicate virtual objects are nearby or rendering them in 3D space on top of the video feed if they are in proximity to the user.

Figure 7:
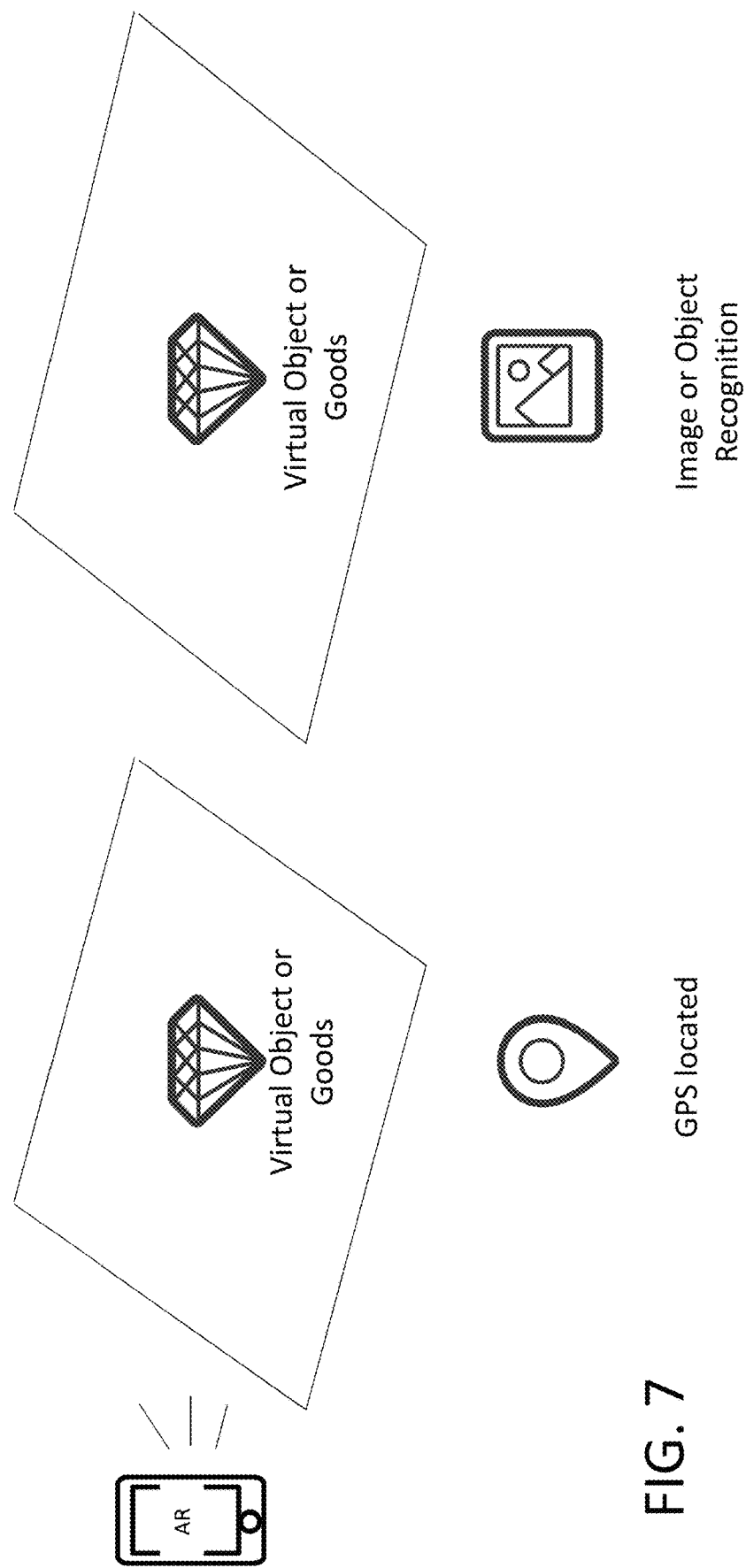
FIG. 7 is a diagram showing an augmented reality example according to embodiments of the present disclosure.

The user can approach nearby objects until they are close enough to render in the live view, and once viewed in this manner, they can use the app interface to select the object and acquire it ("picking it up"), adding it to an inventory list that is part of the application. FIG. 7 illustrates a diagram showing an augmented reality example according to embodiments of the present disclosure.

Example 7: Cross-Platform, Virtual World, Virtual Reality, Game, Etc

Discovery and acquisition of virtual objects that are enabled as virtual goods may also occur in other applications such as games on mobile devices, smartphones, game consoles, arcade games, location-based entertainment, 3D games, 3D worlds, virtual worlds, massively multiplayer online games, virtual environments, and virtual reality. These objects may be picked up, added to inventory, or otherwise claimed and acquired by the user.

Virtual goods objects may be created through the platform (as in Example 1) and connected to the servers or application for the game, virtual world, etc. and populated (generated)

in those systems through an API. When the virtual goods objects are acquired, the servers or application communicates through the API to the virtual goods server or application, authenticating the transaction and validating the acquisition by the user (which can then be transferred to any other application, server, game, virtual world, augmented reality application, etc.).

Figure 8:
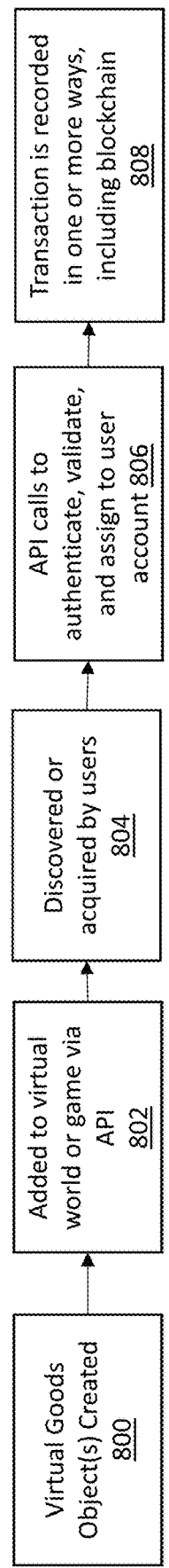
FIG. 8 is a flow diagram showing an example application for cross-platform, virtual world, virtual reality, and game use according to embodiments of the present disclosure.

FIG. 8 illustrates a flow diagram showing an example application for cross-platform, virtual world, virtual reality, and game use according to embodiments of the present disclosure. Referring to FIG. 8, the method includes creating 800 virtual goods object(s). The method also includes adding 802 to the object(s) to a virtual world or game via an API. Further, the method also includes discovering or acquiring 804 the object(s) by users. The method also includes API calls 806 to authenticate, validate, and assign to a user account. Further, the method includes recording 808 the transaction in one or more ways. Recording may be by, but not limited to, a blockchain technique.

In an example use case, virtual goods are created through an application, web interface, or through API on the virtual goods server, enabling the placement of the virtual goods within a third-party virtual world, game, virtual reality, website, chat program, social media platform, or other platform. When a player or user discovers or acquires the virtual goods object within those platforms, the servers are updated and the transaction is communicated via API to the virtual goods server and added to the user's account and inventory.

Example 8: Direct Purchase

In addition to finding and discovering virtual objects that are enabled as virtual goods, the user may acquire them through purchasing them through a marketplace that provides direct purchasing of virtual objects and virtual goods, or real-world merchandise. When directly purchasing virtual goods, ownership is transferred to the user, and they may exchange, activate, redeem, or convert the object in the future for the real-world goods; transfer, trade, or sell to another user. Alternatively, they may purchase real world goods and merchandise at a physical store, a website, or through a software application on a computer (such as a desktop) or a smart device (such as a smartphone or tablet). Purchasing the real-world goods or merchandise also gives the user the virtual goods object, which is representative of ownership of the real physical objects.

Example 9: Trade, Transfer, Sale, Loan

In accordance with embodiments, users may acquire virtual goods objects through transfer, trade, or sale with another user. In this example, User1 has previously acquired the virtual goods object, and transfers it to another user through any of a variety of means that include but are not limited to: in-app trade or transfer; list for trade or sale on a website or marketplace; remove from inventory and place in an augmented reality scene, game, or 3D environment (similar to discovery in Examples 6 and 7); or transfer through some other platform such as email, SMS, instant messaging, or other cross-platform method that enables sharing of digital media. Users may also temporarily transfer (loan) a virtual object or virtual goods object to another user, maintaining ownership and redemption rights. Loaned virtual goods objects may not be exchanged, redeemed, transferred, or traded to other users, and will revert possession based on one or more conditions (such as a time limit).

Figure 9:
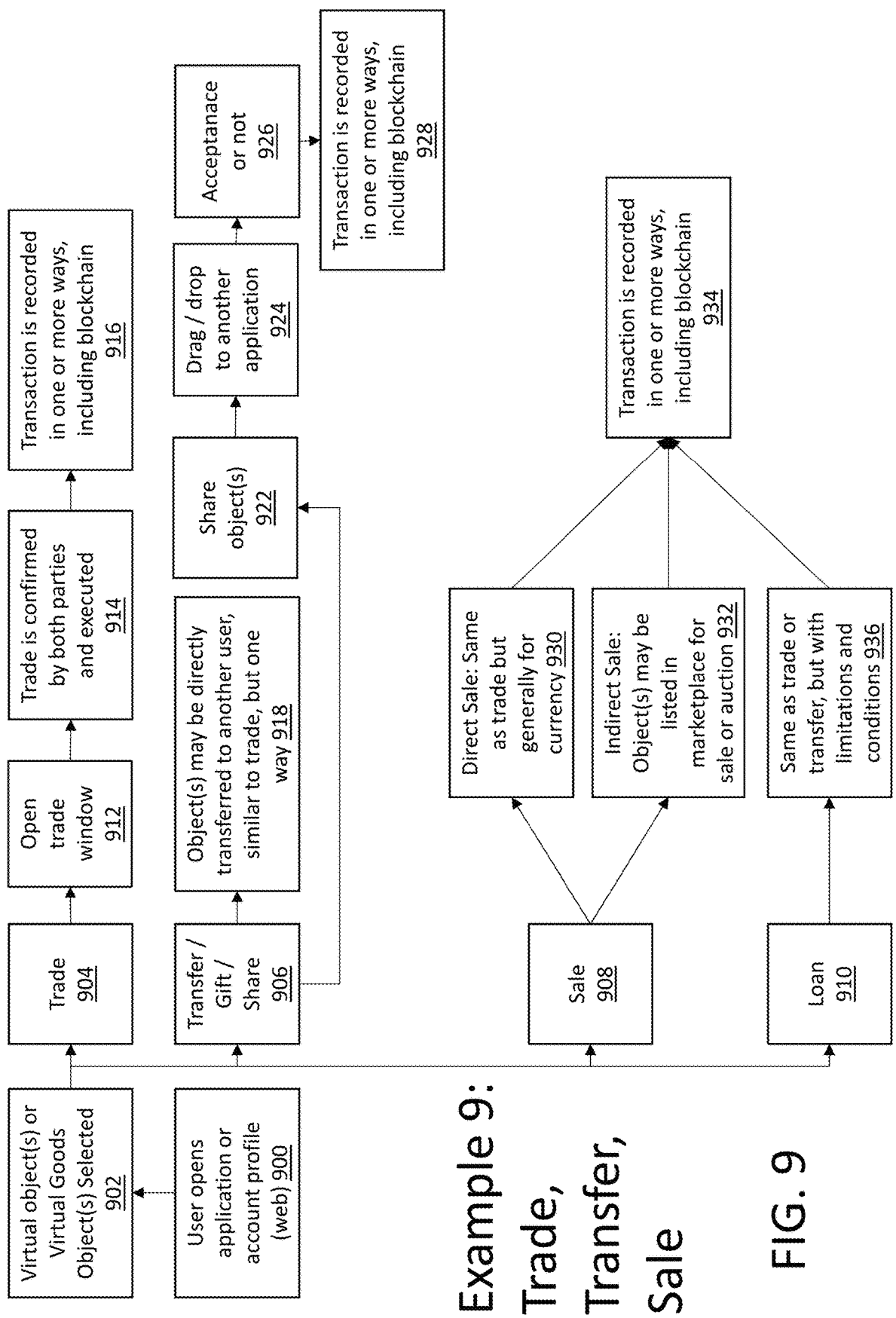
FIG. 9 is a flow diagram showing an example of trade, transfer, and sale according to embodiments of the present disclosure.

FIG. 9 illustrates a flow diagram showing an example of trade, transfer, and sale according to embodiments of the present disclosure. The method of FIG. 9 may be implemented by any suitable system such as the system shown in FIG. 2. For example, the method may be implemented by the computing device 102 and the server 202 shown in FIG. 2.

The method of FIG. 9 includes opening 900, by a user at a computing device (e.g., computing device 102 shown in FIG. 2), an application or account profile. Further, virtual object(s) or virtual goods object(s) may be selected 902. Subsequently, the user may optionally select to trade 904, transfer/gift/share 906, sale 908, or loan 910 the virtual object(s) or virtual goods object(s).

Turning first to the option of trading 904, subsequent to its selection a trade window is opened 912. During this time, both users may select one or more virtual objects or virtual goods objects to trade. The transaction may include currency or any other suitable exchange of consideration. Subsequently, a trade may be confirmed by both parties and executed 914. Further, the transaction may be recorded 916 in one or more ways, including blockchain.

Now turning to the option of the transfer/gift/share 906, the object(s) may be directly transferred 918 to another user. Further, for example, objects may be "shared" 920 across different cross-platform applications, similar to photo and link sharing using apps and social media. In this example, a user may select to share and drag and drop 924 the object to another application. Further, in this example, a recipient may accept the share/gift of the object, or otherwise the transaction is cancelled or reversed 926. Subsequently, the transaction may be recorded 928 in one or more way, including blockchain.

Now turning to the option of selling 908 the object(s), the method includes either directly selling 930 the object(s) or indirectly selling 932 the objects. Subsequently, the transaction may be recorded 934 in one or more way, including blockchain.

Now turning to the option of loaning 910 the object(s), the method includes implementing 936 a step that is the same as trading or transfer of the object(s), but with limitations and conditions. Subsequently, the transaction may be recorded 934 in one or more way, including blockchain.

Example 10: Activity/Task

In an example, the presently disclosed subject matter may automatically create a virtual goods object or item based on user activity, actions, conditions, or the completion of one or more activities or tasks, which may or may not have a geolocal element or prerequisite.

In an example, a user interacts with an augmented reality application on a smartphone to complete a series of geolocated tasks and activities such as "checking in" to multiple locations and solving a 3D augmented reality puzzle at each location, scanning a QR code at each location, or some other task like taking a photo of a recognizable landmark. Upon completing a series of these activities or tasks, a virtual goods object (which may be exchanged for some real-world goods, special offer, or merchandise) may be created and given to the user.

Example 11: Multi-Factor Conditions for Discovery

In another example, similar to Example 10, multiple conditions may be met for virtual object or virtual goods discovery and/or creation. In an example of multi-factors or conditions, a user must be at or within certain distance of a specific location (geolocal), a time or date condition must be met, and the user must also have met some other prerequisite (such as completing a task or activity at a different location) or do some other activity such as scan an image, poster, sign, bar code, or QR code (e.g., Example 5). Two or more of these conditions must be met to satisfy the multi-factor conditions to create the object and make it available or accessible to the user to discover, interact with, or acquire.

Example 12: Aggregation or Combination

In accordance with embodiments, some virtual goods objects can only be obtained through the collection of other virtual objects (which may or may not be virtual goods) or the combination of two or more virtual objects or virtual goods. In this example, User1 collects ten different virtual objects and virtual goods that are designated as a set or a collection. Upon completing the collection, a new virtual goods object is created and given to the user, which may then be traded, sold, transferred, or exchanged, activated, redeemed, or converted for the linked real-world goods.

In a variation of this example, User1 collects ten instances of a particular virtual object, which can then be combined into a new virtual goods object (thus destroying the original ten instances) which is created and given to the user, which may then be traded, sold, transferred, or exchanged, activated, redeemed, or converted for the linked real-world goods.

Example 13: Social Media Integration

In embodiments of the present disclosure, virtual objects and virtual goods objects (represented as 2D icons or images (static or animated) or as 3D objects) can be transferred from one application (such as an augmented reality application) or web interface (such as a user account or profile page with an inventory listing of virtual objects and virtual goods) to another user directly or indirectly through another cross-platform application (including but not limited to instant messaging apps, social media sites, SMS, or other social media applications, or viewers, or game applications).

This part of the present disclosure can be the method and process of transferring a 3D object virtual good (i.e., a 3D coffee cup that can be redeemed for a free coffee at Starbucks) to another user through social media integration.

The system may enable a user to find or discover the 3D coffee cup with their AR application, trade it to other users, or exchange/redeem it for real world goods (free coffee). They can also place the object in an AR scene where it can be discovered, interacted with, or acquired by other users.

In this implementation, the user can access their AR app, open an inventory tab or window (showing all of the 3D objects and virtual goods they own and that is associated with their device), and "share" it with another user through social media integration (i.e., SMS, email, Facebook Messenger, WhatsApp, Skype, WeChat, etc.) in the same fashion that users share a web link, an image, a gif, or a file.

When the recipient clicks the object/link the transaction is communicated to a server or local node, and fully transferred to the new user. They may then treat the virtual goods object as the original user . . . saving it to inventory, placing it in an AR scene, transfer it to another user, or exchange/redeem the object.

Figure 10:
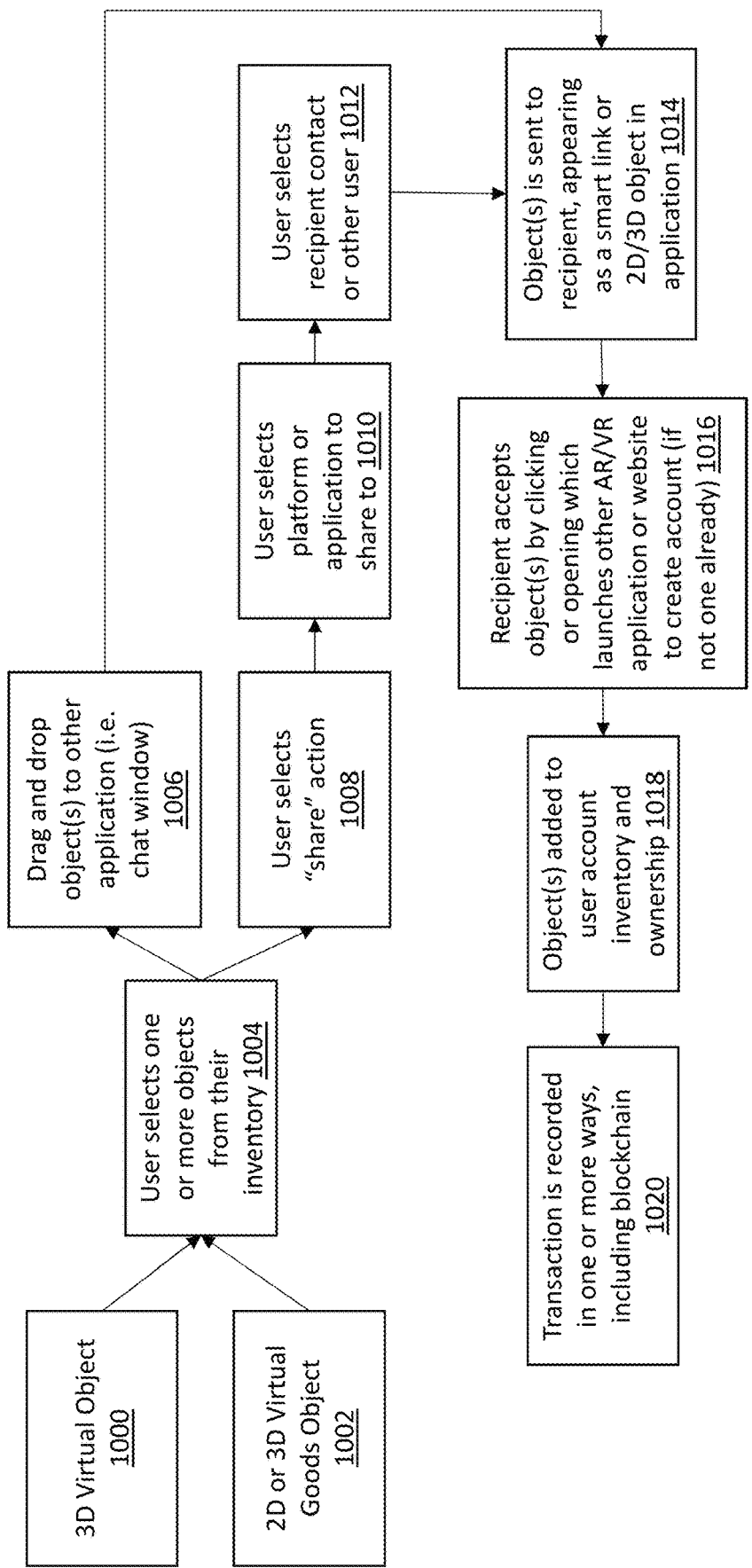
FIG. 10 is a flow diagram showing a social media integration example according to embodiments of the present disclosure.

FIG. 10 illustrates a flow diagram showing a social media integration example according to embodiments of the present disclosure. The method of FIG. 10 may be implemented by any suitable system such as the system shown in FIG. 2.

For example, the method may be implemented by the computing device 102 and the server 202 shown in FIG. 2.

Referring to FIG. 10, the method includes providing a 3D virtual object 1000 or a 2D/3D virtual goods object 1002 in a user's inventory. Subsequently, the user may select 1004 one or more of the objects from the inventory. In one option, the user may drag and drop 1006 the object(s) to another application. In another option, the user may select a "share" action 1008.

Subsequent to step 1008, the user may select 1010 a platform or application to share to. Further, the user may select 1012 a recipient contact or other user for sharing. The method also includes sending 1014 the object(s) to the recipient. Further, the recipient may accept 1016 the object(s) and the object(s) may be added 1018 to the other user's account inventory and ownership. Subsequently, the transaction may be recorded 1020 in one or more way, including blockchain.

In an example use case, User1 is at Starbucks, turns on their app, and discovers a 3D coffee cup in the middle of the café. They select and acquire the object, adding it to their inventory. They could immediately exchange it at the order counter for a free small regular coffee, but they choose to send it via Facebook Messenger to a friend in another state. That friend accepts the object, adding it to their app inventory. They then drive over to a local Starbucks and exchange it for a free coffee. While they are there, they also buy a bagel. This drives traffic and new business to Starbucks.

In another variation, User1 opens an augmented reality application, selects a virtual object or virtual goods object, selects a share or trade option, and then selects a user contact through some other application, in a similar fashion as how users currently share news, links, photos, and other media from one application to another. In the case of the present disclosure, certain properties and data related to the virtual object or the virtual goods are transmitted in addition to the graphical representation, updating the ownership of the object, and recording the transaction on one or more servers, databases, devices, and/or blockchain ledgers.

The receiving user may or may not be required to accept the transfer of the object and ownership, depending on the implementation of the application(s) used.

Example 14: Multi-Media and Cross-Platform Sources

In another example, a user with an application on a smart device (such as a smartphone or tablet) may use computer vision and sensor fusion techniques to recognize certain audio or visual cues from another source such as a radio or TV, which triggers an augmented reality experience (such as characters on a TV or movie screen coming alive and "popping out of the screen") which triggers the generation of the virtual object or virtual goods in the augmented reality 3D space, that can then be picked up and acquired by the user.

For example, the user may be running an augmented reality app on their smartphone and the phone's camera is pointed at a television screen during commercials occurring in breaks of a sporting event. When certain commercials run, the app recognizes images or cues, and then creates 3D objects or other media, giving the appearance of objects or characters emerging from the screen, which are then possible to interact with, or pick up. These objects may or may not be enabled as virtual goods (linked to real-world goods and merchandise). These objects may also be collections of objects, complete scenes (multiple objects associated with each other), or animated characters "coming to life" in augmented reality.

Figure 11:
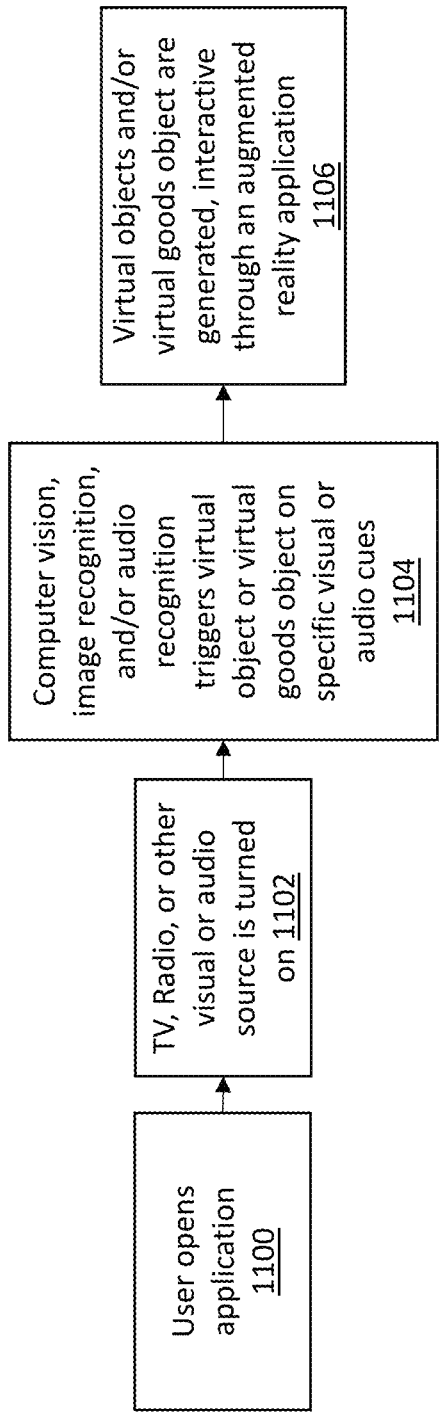
FIG. 11 is a flow diagram showing a multi-media and cross-platform sources example according to embodiments of the present disclosure.

FIG. 11 illustrates a flow diagram showing a multi-media and cross-platform sources example according to embodiments of the present disclosure. The method of FIG. 11 may be implemented by any suitable system such as the system shown in FIG. 2. For example, the method may be implemented by the computing device 102 and the server 202 shown in FIG. 2.

Referring to FIG. 11, initially a user may open 1100 an application. Subsequently, a television, radio, or other visual/audio source may be turned on 1102. Further, the method includes computer vision, image recognition, and/or audio recognition triggering 1104 a virtual object or virtual goods object on specific visual or audio cues. The method also includes generating 1106 virtual objects and/or virtual goods object being interactive through an AR application. These object and virtual goods may be singular or multiple, and may take any suitable form, including animated objects, characters, or scenes with multiple objects and/or characters.

Conversion and Redemption

In accordance with embodiments, virtual objects that are enabled as virtual goods (linked to real-world goods, assets, services, offers, merchandise, and more) can be exchanged, activated, redeemed, or converted into their real-world counterpart or the thing they are representative of or linked to. For example, a 3D virtual object of a pair of sneakers may be enabled as a virtual goods object and represents a pair of sneakers in the real world, or an offer (such as a discount when buying), or something like access to an event (i.e. owning the 3D virtual goods object of the 3D sneakers grants the owner access to a VIP promotional event at a sneaker store where special deals or a private event is occurring).

These virtual goods objects can be exchanged, activated, redeemed, or converted in multiple ways. The presently disclosed subject matter is based on selecting a virtual goods object from an interface or list of objects; choosing to exchange, activate, redeem, or convert; confirming the action; verifying with the vendor; completing the process; and validating the transaction in one or more applications, databases, and transactional records (including blockchain and other methods). In some cases, the virtual goods object is destroyed or otherwise deleted from the system at this point, and in other cases, the properties of the object are updated to reflect that it has been used and is now a normal virtual object (no longer linked to real-world goods).

Example 15: In-System, In-Application

In this example, the whole process is contained within a system, platform, or network for augmented reality, virtual reality, or other virtual environment (2D or 3D, game or otherwise) within a single application (such as an augmented reality application on a smartphone or other device). The user can open the app, go to an inventory screen, select the object, select an option to exchange, activate, redeem, or convert the object, then confirms the transaction.

Information is then communicated to one or more servers and or databases, which then triggers a fulfillment process. In this case, since the whole transaction is occurring within the same system, user information and personal details, are already known, and the real-world goods or merchandise can be sent and shipped to the user by mail.

In one variation, a user goes to a website and buys a bouquet of 12 roses and opts to receive a 3D virtual goods object of the bouquet. The real-world goods of the bouquet are paid for and technically owned by the user, but not delivered or fulfilled as yet. The virtual goods object's properties are updated with information about the owner, the sale, and the transaction (certain details may be encrypted or abstracted out and stored elsewhere using other data (such as hashIDs, links, urls, unique object ID, etc.).

Figure 12:
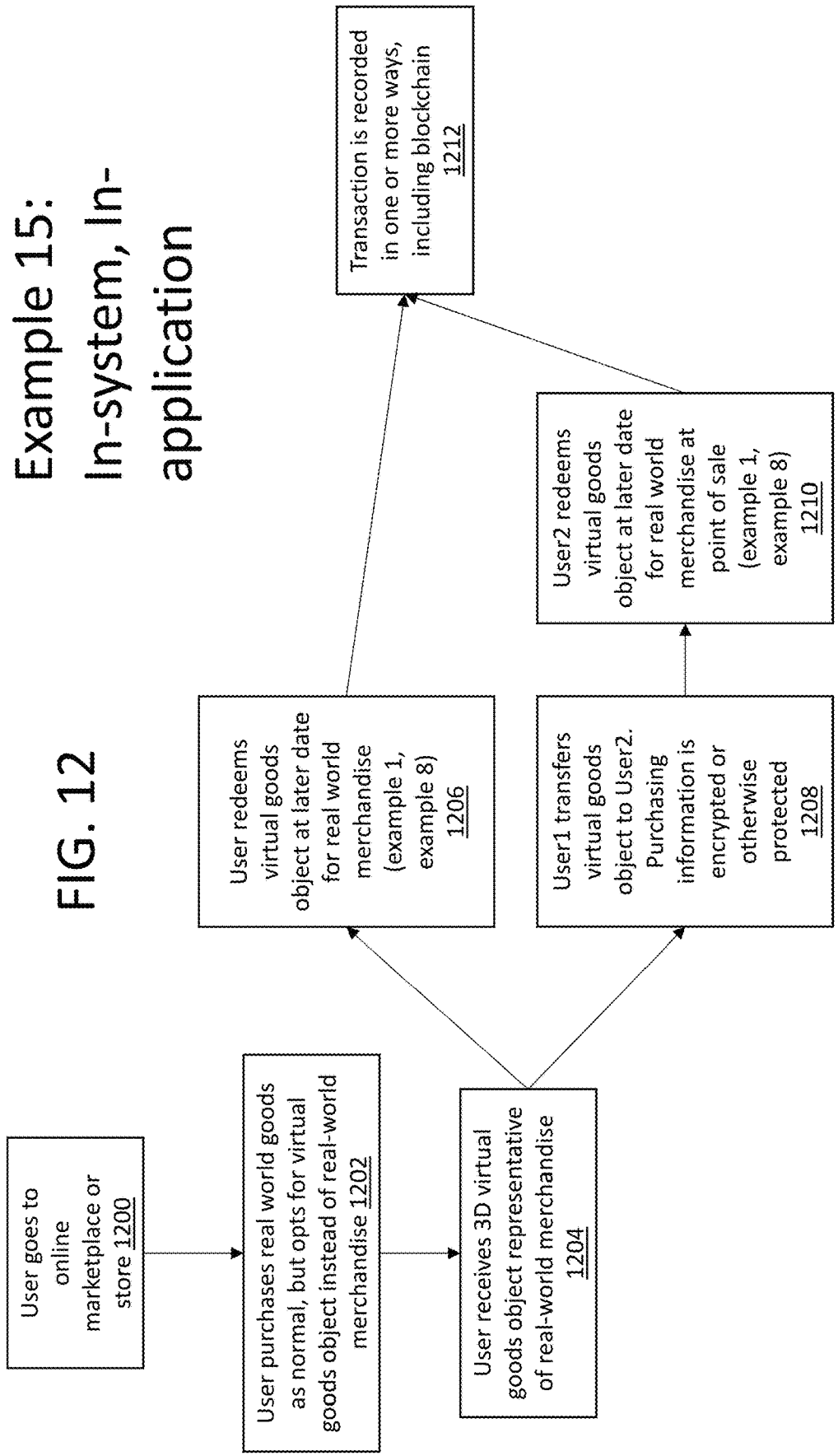
FIG. 12 is a flow diagram showing an in-system, in-application example according to embodiments of the present disclosure.

The user may choose to redeem the object at a later date within the system, resulting in a shipment of a bouquet of roses to their address, or they may choose to sell, give, or trade the object to someone else, who can then redeem the object much in the same manner, except this time, the second user's shipping information is used, and the original owner's personal information is never disclosed FIG. 12 illustrates a flow diagram showing an in-system, in-application example according to embodiments of the present disclosure. The method of FIG. 12 may be implemented by any suitable system such as the system shown in FIG. 2. For example, the method may be implemented by the computing device 102 and the server 202 shown in FIG. 2.

Referring to FIG. 12, the user may use 1200 a smartphone or other computing device to go to an online marketplace or store. Further, the user may user 1202 the smartphone to purchase real world goods, and opt for a virtual goods object rather than real world merchandise. The method also includes the user's smartphone receiving 1204 a 3D virtual goods object representative of the real world merchandise. Optionally, the user may user the smartphone to either redeem 1206 or transfer 1208 the virtual goods object. Subsequent to step 1208, the user may redeem 1210 the virtual goods object. At step 1212, the transaction is recorded in one or more way, including blockchain. v Example 16: Point of Sale In another example, the user goes to a vendor, retailer, place of business, or venue, then uses a software application or web interface on a smartphone or other internet enabled device to access their account inventory, select and open the relevant virtual goods object, choose a redeem or convert function, and then display a unique code, bar code, QR code, or some other unique identifier at the point of sale (generally the check-out counter or at the entrance to an event), which is then validated at the point of sale (including but not limited to a scanner at a cash register, a hand scanner, RFID, Bluetooth, etc. or some other point of sale method) which updates the system (as previously described). Alternatively, the user may enter a code, a unique code, or scan a bar code, QR Code, or some other identifier confirming the user is at the proper location and verifying the transaction. In either case, the redemption process may result in the destruction of the virtual goods object or change its properties to downgrade it to a simple virtual object (as in Example 12).

Example 17: Other, Such as a Website

In another example, the user may use a different method, such as going to a website, adding a product to their cart, and then during the check-out process, enter in a code that results in applying a price change to the goods or merchandise in the cart to reflect the virtual goods object.

To illustrate, the user opens an app or a website to access their account and inventory of virtual goods objects, selects an object, opens a properties dialog or window, and selects one of the unique identifiers or codes for the virtual goods object. This is entered during the check out process. If the virtual goods object was designated as worth one pair of sneakers for free or at a discount, the equivalent price change would occur in the cart.

Upon finalizing the order, the system can be updated (again, as previously described in this section), confirming and validating with the merchant, resulting in the shipment of the goods or merchandise to the user.

Conditional Interactions, Content Triggers, and Lock/Unlock Content

Part of the present disclosure may include interacting with augmented reality or virtual reality content, such as a simple or complex 3D object, collection of 3D objects, etc. (such as a switch, button, dial, 3D key and keyhole or lock, an interactive puzzle (such as a 3D Rubik's cube), etc., which must be properly interacted with, solved, or some other conditional interaction, in order to lock, unlock, hide, or make visible, or gain/restrict access to some other object(s) or content. This is similar but different to Examples 8 and 9 previously.

Example 18: Lock/Unlock/Hide/Reveal

In accordance with embodiments, a user may find or acquire an object, such as a 3D key of a certain type (with certain behaviors and properties) and use it to interact with another object (like a keyhole or a lock in AR or in VR), which can then satisfy a condition to gain access (or restrict access) to some other content. Other conditions or requirements may include location, time, etc. or prerequisites such as having one or more virtual objects or virtual goods already in inventory (as in Examples 5, 10, and 11).

Unlocking a 3D chest with the proper key may subsequently give the user access to the contents inside of the chest. Or in another variation, going to a location and pushing a 3D button object or solving a 3D puzzle may subsequently make some other content appear or be accessible at that location, or at some other location.

In this part of the presently disclosed subject matter, a user may need to go to a real-world location, engage with AR content at that location, such as "a 3D button mounted on the wall in the food court at the local Mall), which can then satisfy a condition for making some content at that location or another location to be viewable or accessible. In this example, pushing the button at the local mall will reveal a 3D puzzle at another nearby retail location, which other users at that location could then access and solve, thus revealing content at yet another location, this time a local park (such as collectible 3D objects or other content).

In a similar fashion, interacting with objects that have conditional properties, requirements, or interactions in AR could affect content only accessible in the 3D mirror world associated with that location, or vice versa.

The presently disclosed subject matter as described here (conditional or trigger) content in one location (physical or virtual) changing the properties or states of content in another location (physical or virtual) includes any implementation of augmented reality and content within any corresponding virtual world, virtual environment, virtual reality, or game that is related in any fashion. For example, any activity in an AR application (like Pokemon Go) that would affect content in any virtual reality or virtual world application (like World of Warcraft) and vice versa. It also includes interactions with content in one world or platform that affect content in another world or platform (i.e. manipulating content in Second Life having an effect on content in Minecraft; or solving a puzzle on a webpage or app on a mobile device affecting or modifying content in AR or a 3D game).

Figure 13:
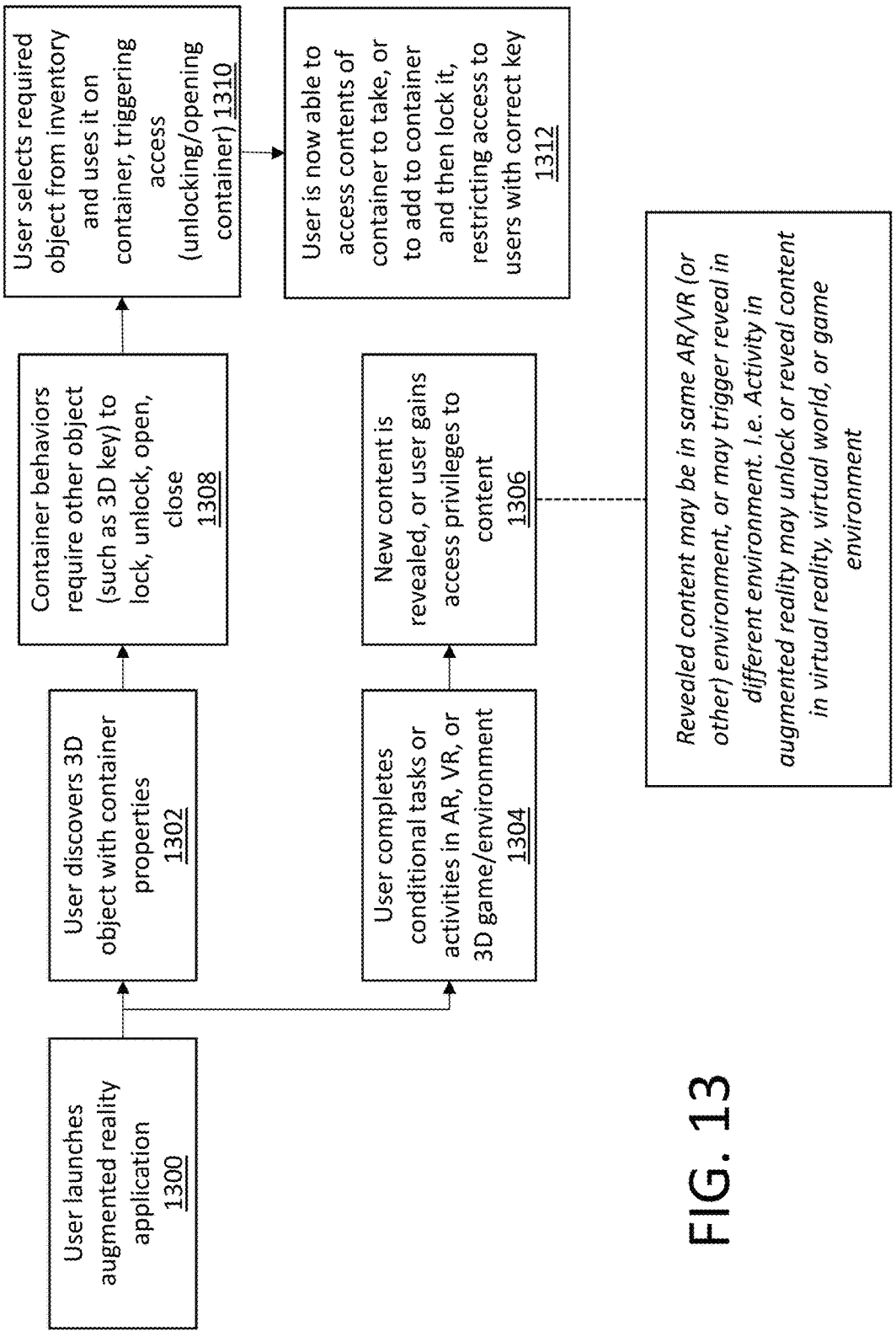
FIG. 13 is a flow diagram showing a lock/unlock/hide/reveal content example according to embodiments of the present disclosure.

FIG. 13 illustrates a flow diagram showing a lock/unlock/hide/reveal content example according to embodiments of the present disclosure. The method of FIG. 13 may be implemented by any suitable system such as the system shown in FIG. 2. For example, the method may be implemented by the computing device 102 and the server 202 shown in FIG. 2.

Referring to FIG. 13, the method includes launching 1300 an AR application. Further, the user may discover 1302 a 3D object with container properties. The method may also include the user completing 1304 conditional tasks or activities in AR, VR, or a 3D gaming environment. Subsequent to step 1304, new content is revealed, or the user gains access privileges to content (step 1306).

At step 1308, contain behaviors may require other objects to lock, unlock, open, close, or the like. The method may also include the user selecting 1310 a required object from inventor and using it on a container to trigger access to the container. At step 1312, the user is now able to access contents of the container to take, or to add to the container, and then lock it. Access may be restricted to users with the correct key.

The present disclosure can include multiple methods of communicating and verifying such interactions and changes that include but are not limited to platform to platform (direct server to server via API) or through a mediating server (for example: game server A communicates to another server B that acts as moderator or database with objects, properties, and behaviors, which then communicates to virtual world server C).

Example 19: Real-World Device Dynamically Changes States, Behaviors, or Properties of Virtual Objects or Virtual Goods Real world devices, computers, mechanical, and electrical objects (collectively, "devices") that are connected to a network or the Internet, etc. communicate with other objects, devices, computers, applications, and/or servers. When these devices are manipulated, activated, deactivated, or otherwise used or interacted with, the state, behavior, or property of a virtual object or virtual goods object (or collection thereof) also changes.

In an example, a connected light switch or lamp when turned on or off in the real-world, would communicate through the network or other devices, and change the state, behavior, or properties of a virtual object or virtual goods object such as a 3D lamp in an augmented reality scene, a 3D scene, a virtual environment, a virtual world, or virtual reality environment into the corresponding on or off position.

In another implementation, locking or unlocking a door in the real world that is likewise linked to a network, other devices, computers, or applications, would change the state, behavior, or properties of a virtual door in an augmented reality scene, a 3D scene, a virtual environment, a virtual world, or virtual reality environment.

Conversely, actions and interactions to 3D virtual objects or virtual goods in augmented reality, virtual reality, virtual worlds, virtual environments, games, etc. would affect real world devices in the same manner, i.e. interacting with a 3D light bulb can turn on or turn off a real world light or light source with the same connectivity as described.

Figure 14:
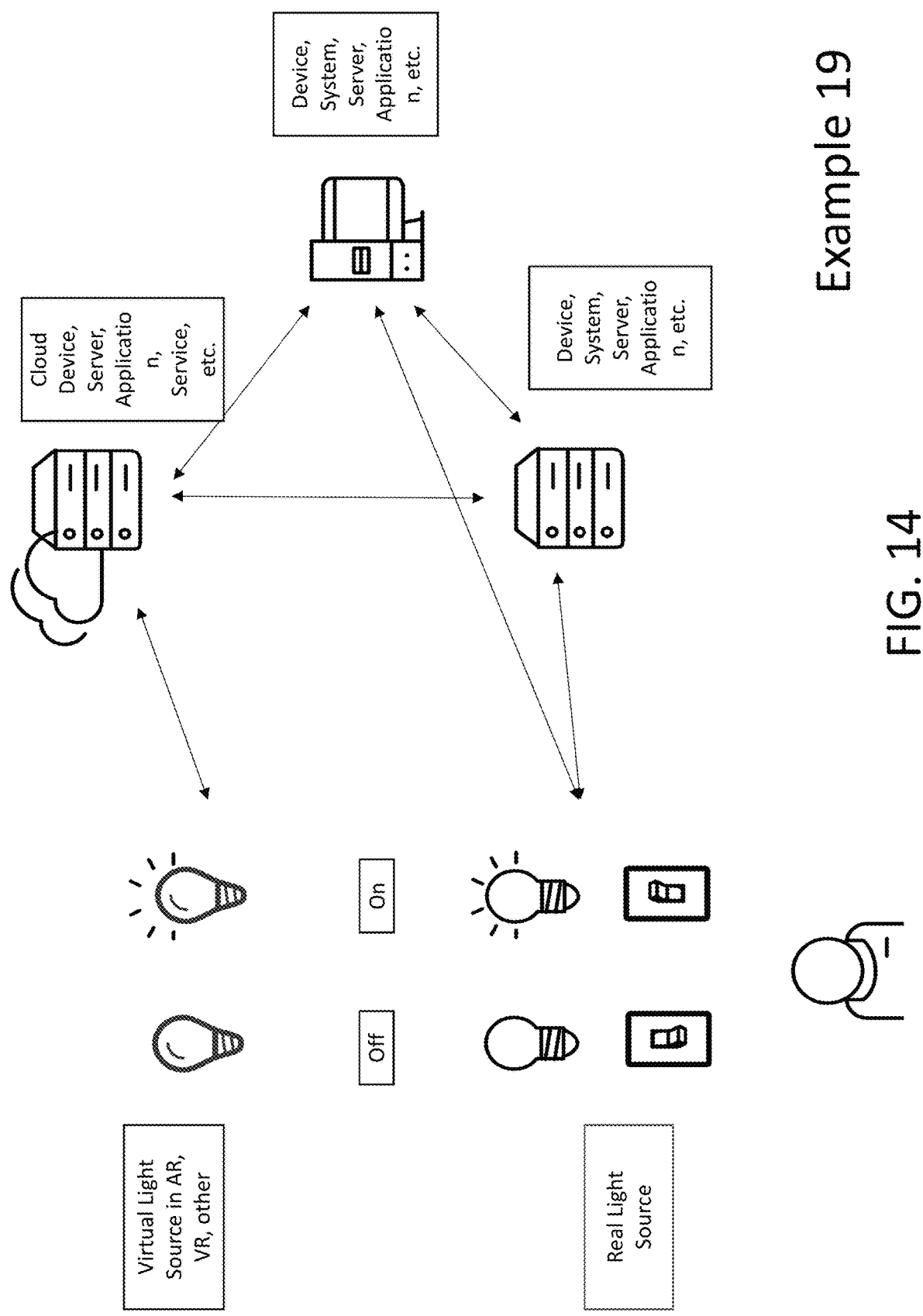
FIG. 14 is a diagram showing an example of state and property change according to embodiments of the present disclosure.

FIG. 14 illustrates a diagram showing an example of state and property change according to embodiments of the present disclosure. The method of FIG. 14 may be implemented by any suitable system such as the system shown in FIG. 2. For example, the method may be implemented by the computing device 102 and the server 202 shown in FIG. 2.

Geolocal AR/VR Server and Hybrid Distributed and Decentralized Architecture

Augmented reality applications are generally an application running on a device in a single-user implementation, or there is some server or cloud component that either serves content or provides for limited multi-user experiences (even if those experiences are not necessarily shared experiences where users are interacting with the same instance of content).

Server elements may be client/server based, where the user application interacts with one or more remote servers in a specific configuration, or distributed among multiple servers or virtual machines in a cloud-based configuration ("the cloud", or "AR cloud").

The presently disclosed subject matter may be based on a distributed and decentralized system where a "server" or "node" application runs on a device, such as a server, a dedicated device (computer, server, desktop, tablet, smartphone, etc.) that is limited in scope and dedicated to serving one or more specific locations (generally one location, such as a home, an office, a retail location, a park, etc.) and is generally (but not always) physically located at or near the location being served instead of remotely "in the cloud" or on a server farm.

This local node server application stores all 3D mapping data, the location of any/all 3D objects, geospatial positions of real-world devices, sensors, peripherals, and IoT devices, maintains the states and properties of all content at the location, provides access control and user privileges, tracks and records all activity and transactions, maintains geolocal blockchain records and history, maintains one or more databases, and acts as a server for all geolocated augmented reality, virtual world, and virtual reality experiences specific to that location.

Each local node communicates with other nearby geolocated nodes, sharing information, backing up data, validating users, activity, mapping, and transactions, as well as communicating certain data to other remote servers. Any node can communicate with other nodes or servers to authenticate user identity, transaction history, activity, and virtual object or virtual goods ownership.

Example 20: Geolocal AR/VR Server Node(s)

An application may be installed and run on a user's home desktop computer or dedicated computing device. It stores all 3D mapping data, the location of any/all 3D objects, geospatial positions of IoT, sensor, and other devices, maintains the states of the content, controls access to content (privilege-based access system), tracks all activity and or transactions, records all activity and or transactions to one or more blockchains, etc.

This node or server is the primary or master controller for the location and is registered to the location. User applications (generally an AR app that runs on a device) connect to this server (via WI-FI®, Bluetooth, TCP/IP internet protocol, cellular network, or any other communications methodology), authenticates the user, sends and receives mapping data, handles localization, stores content, media, and virtual objects (typically, but not limited to 3D), collects sensor data (from IoT devices, etc.), and so forth FIG. 15 illustrates a diagram showing an example distributed and decentralized architecture according to embodiments of the present disclosure. The method of FIG. 15 may be implemented by any suitable system such as the system shown in FIG. 2. For example, the method may be implemented by the computing device 102 and the server 202 shown in FIG. 2.

The server or node also communicates with other local nodes, sharing necessary data in a distributed and partially decentralized fashion. Each node works with other nearby nodes for load balancing (if too much user activity is happening at a location, a node may share some of the processing with other nearby nodes). All mapping and other AR content data is duplicated on a limited number of other nearby nodes and verified through blockchain validation. Changes on one node (user activity, changes to the mapping data, etc.) are communicated to these other nearby nodes, updating their database and data as necessary.

Figure 16:
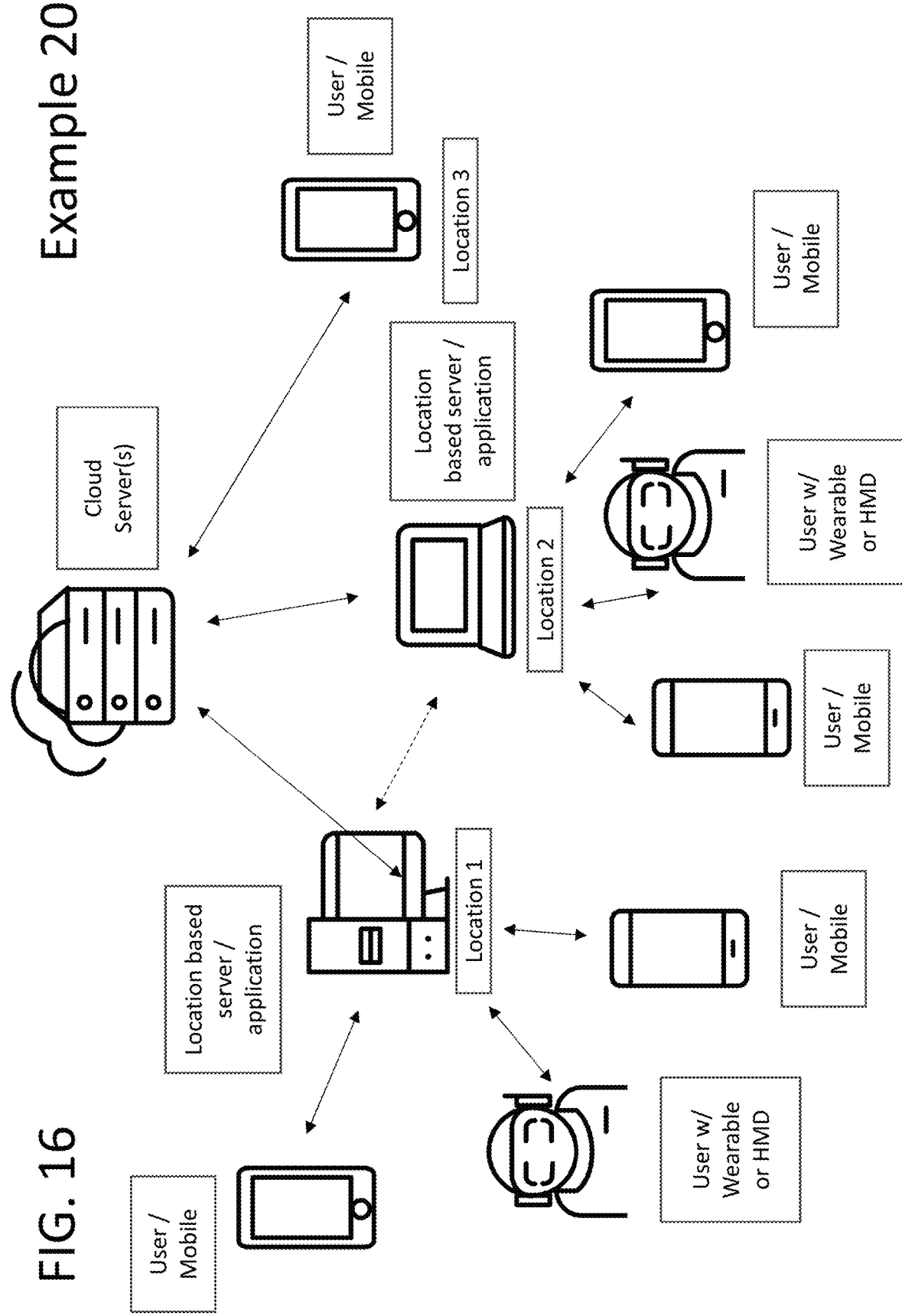
FIG. 16 is a diagram showing another example distributed and decentralized architecture according to embodiments of the present disclosure.

FIG. 16 illustrates a diagram showing another example distributed and decentralized architecture according to embodiments of the present disclosure. Geolocated AR/VR applications and servers (nodes) communicate with nearby nodes and may overlap. This is used for backups of data, verifying changes, and load balancing between nodes in the same geographic area. All activity and transactions may be recorded to blockchain specific for that location and nearby areas. Local nodes act as consensus parties to verify transactions before committing to the blockchain.

On a regular or semi-regular basis, this data and changes to the data (or transaction history of the blockchain) are copied to other area or regional nodes/servers to back up the data, manage authentication, and ultimately record all transactions on one or more master blockchains.

While there are some efforts to bring blockchain to augmented reality or virtual goods/objects, this model of distributed nodes that are geolocated, with multiple levels of authentication, validation, consensus, etc. is novel primarily due to the geolocal aspect, and other elements of how the nodes interact with each other, instead of a single centralized server, "cloud", or "AR cloud".

In cases where a User with an app on a device wishes to map a location, or find and interact with augmented reality content and there is no local node that has previously been designed to serve a given location where the User is at, the application communicates with a master server (login server, location server, or other), and the local data and content for the experience is handled on an area, regional, or national node until a dedicated local node is in place.

It is noted that a location may have one or more nodes serving it. In this case, the nodes interact and share load balancing and processing, while regularly updating each other and verifying activity and transactions between each other and other local, area, or regional nodes.

Further, users that set up and maintain a node (which we term as a "Local Node" or "Local Node Host") they may pay for rights to be a primary or exclusive host for a given location. Such rights may be limited in geographic size (i.e. specific location such as a retail store, an area such as "anything within a 100 meter radius of specified GPS coordinates) or in time (such as rights to serve an area or location for the duration of 1 year). Such rights are modeled similar to a lease with limits and expiration which may be renewed or extended based on a payment, subscription, or winning bid in an auction. Rights may also be transferred to other users.

Any content that is hosted at that location, any transactions (user to user trade, sale, etc.), or paid advertising at that location, may generate revenue (fees or otherwise) that may be shared with the user that operates the local node (as a royalty or profit sharing). This is also part of the presently disclosed subject matter.

Seamless AR/VR Blend

The idea of creating a 3D world or virtual reality world/environment that is effectively a "mirror" of a real-world location is not new.

The presently disclosed subject matter may use 3D mapping data from scans for both localization of the user(s), placement and interaction of content (generally 2D and 3D objects or data visualization) AND a 3D "mirror" virtual world or environment. Instead of a fixed 3D environment that is static and unchanging, the mirror virtual world is dynamic and changes based on what happens in the real world.

Example 21: Seamless AR/VR Use Case 1

The presently disclosed subject matter may include this use case:
While a User1 moves around in the real world, experiencing augmented reality overlays (data, 3D objects, etc.), the same mapping used for localization and placement of digital media can be used to create a mirror VR environment. A remote user (User2) can use a 3D application or VR to access that 3D environment, seeing 3D avatars representing users in the real world as they navigate around the location, while those users see a 3D avatar in AR space that represents the remote access VR user(s).
Later, User1 is at home and logs into a system that enables a user to explore 3D environments, some of which are linked to specific real-world locations. User1 enters in data related to the location he was at earlier and access the map and a 3D experience of that map, which he can experience on his desktop computer like any other 3D environment, or he can experience it from a first-person point of view using virtual reality hardware, similar to User2's remote experience.
User2 dons a virtual reality head-mounted display, and begins to explore the environment. As User2 is exploring the environment, the 3D world shows an avatar representing him moving around. User1, at the location, sees this avatar, life-size, maneuvering around the room through augmented/mixed reality, while User2 sees a 3D representation of User1 in the virtual environment.
If User1 moves a real-world object, the corresponding 3D object or bounding box in the mirror virtual world also moves (and User 2 sees and experiences this change). In the same fashion, if User1 or User2 moves a 3D virtual object in either AR or VR, the object is similarly moved in the other environment.

Figure 17:
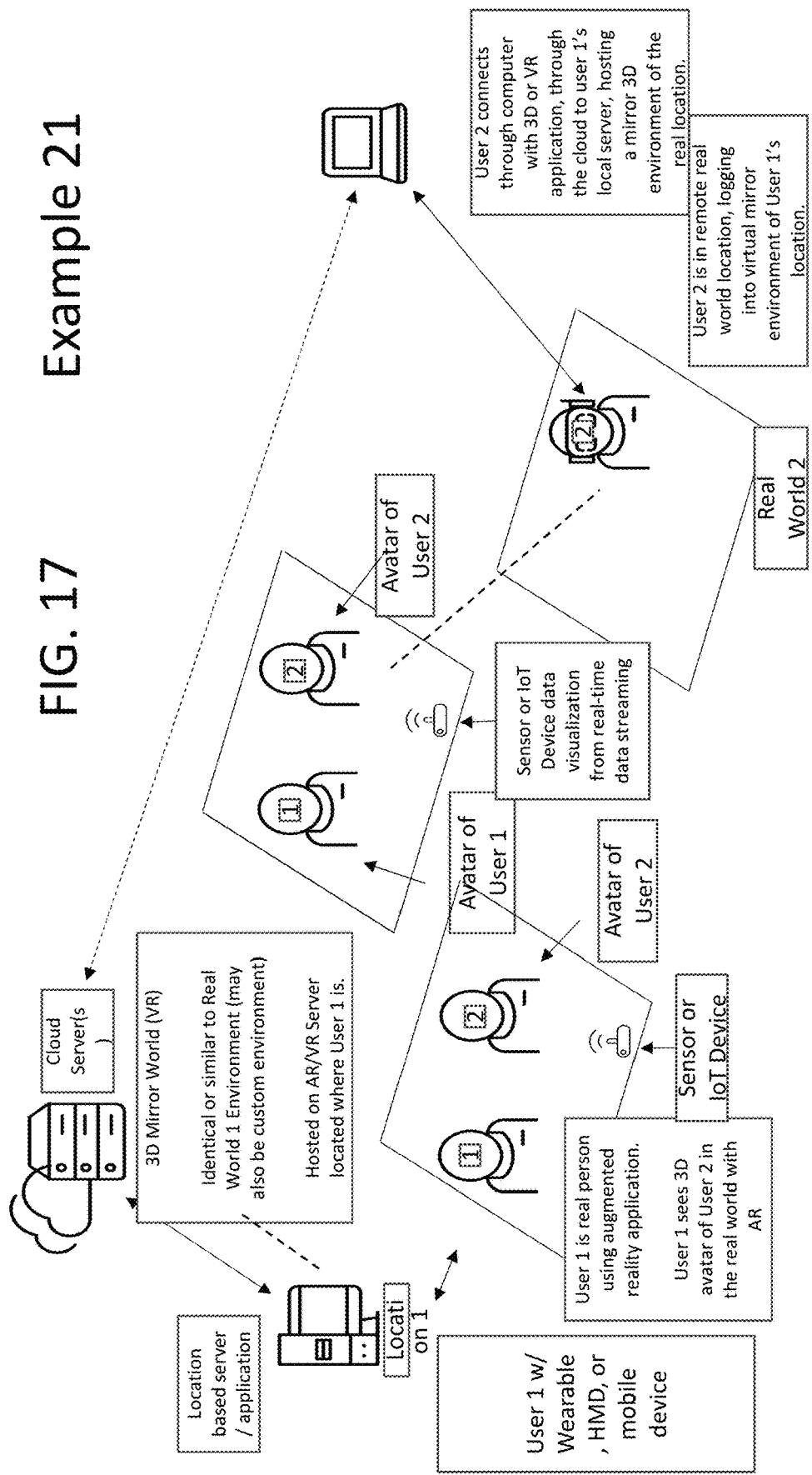
FIG. 17 is a diagram depicting an example of seamless Augmented reality and virtual reality blend according to embodiments of the present disclosure.

FIG. 17 illustrates a diagram depicting an example of seamless Augmented reality and virtual reality blend according to embodiments of the present disclosure.

Example 22: Seamless AR/VR Use Case 2

User1 has mapped their living room using any 3D scanning and mapping methodology. The resulting mapping data is stored (on their device, on a nearby computing device (server, dedicated server, device, dedicated device, server on the Internet, in the cloud, etc.) and associated with their living room, home, address, and GPS coordinate. They create bounding boxes around objects and furniture in the living room, designate the location of other sensors and devices (their TV, smart lamps, electronic clock, etc.), link each of those to the network (so their data is now accessible to the location and authorized users to see the resulting data and data visualization).

At the same time, this mapping data, bounding boxes, and the placement of any 3D objects or other content, automatically is generated as a virtual environment (to scale) which is accessible by other users (authorized with invitation or access privileges).

User1 has a child. The child may use a AR enabled device (smartphone, tablet, wearable display, head mounted display, holographic projection system, etc.) to interact with the AR content.

Another remote user, such as a teacher or therapist, could login to the system and access the location (standard 3D experience on a desktop or perhaps a VR system). Their experience is in a 3D mirror environment of the home, and a 3D avatar acts as their representation. As they move around the 3D environment, their avatar similarly moves around the real-world in AR, giving the child the impression and experience of interacting with the avatar. The location and orientation of the child is represented in the mirror environment as another avatar.

The avatars can be anything. Some users may choose to be represented by a shape, animal, fictional character, collection of shapes, or any 3D object (a purple donut, a popular fictional character from a children's TV show, a celebrity, a unicorn, whatever).

In this case, the teacher or therapist can interact with the child in an educational, entertainment, or therapeutic fashion.

Similarly, other entertainment, educational, training, etc. experiences can be done for adults using different avatars and AR/VR content.

Channels and Layers

Each local node server (node) hosts one or more 3D maps of one or more locations. This mapping data is primarily for three uses:
1) User Localization (determining the position and orientation of each User at the location, as well as real-world objects (walls, floors, furniture, etc.)
2) The basis for a to-scale 3D virtual "mirror" world or environment
3) Content Localization (the position and orientation of each 3D object or data visualization)

The third use, content location and positioning (as well as the properties and states of each object), and other elements (such as virtual lights, 3D physics, invisible objects (generators which create new 3D objects, and many other elements of AR content and experiences) are categorized in channels and layers.

Example 23: Channels and Layers

Augmented Reality content at a location may be divided into multiple channels, and each channel can have one or more layers. The main channel, designated as a "public" channel" may have one or more layers, and each layer can be turned on or off (making associated content visible or invisible to users, based on their access privileges). In general, any content on the public channel (and its layers) is visible at all times to all users.

Other channels (and their layers) are designated as private. The content on these layers is controlled by the user that creates the channel, and is not visible or accessible by anyone else, unless access privileges are granted.

Some channels or their layers may be designated as "subscription" channels, where any user can gain access privileges by paying a subscription fee to the creator of the channel (which may be another user, a company, a service, a game, a data channel, etc.).

Channels (and their layers) may be limited to a specific location or may span multiple locations. For example, an augmented reality game created by a user or a third-party developer to run on the network, may have content at multiple locations, and any access or subscription rights to the channel carry to all locations.

Channels and layers specific to the location are controlled by the owner of the local server application, device, or node. Individual channels and layers for users are controlled by them.

Similarly, 3D mirror map, environment, virtual world, virtual reality content at the location may have one or more instances, each designated as public or private access.

Figure 18:
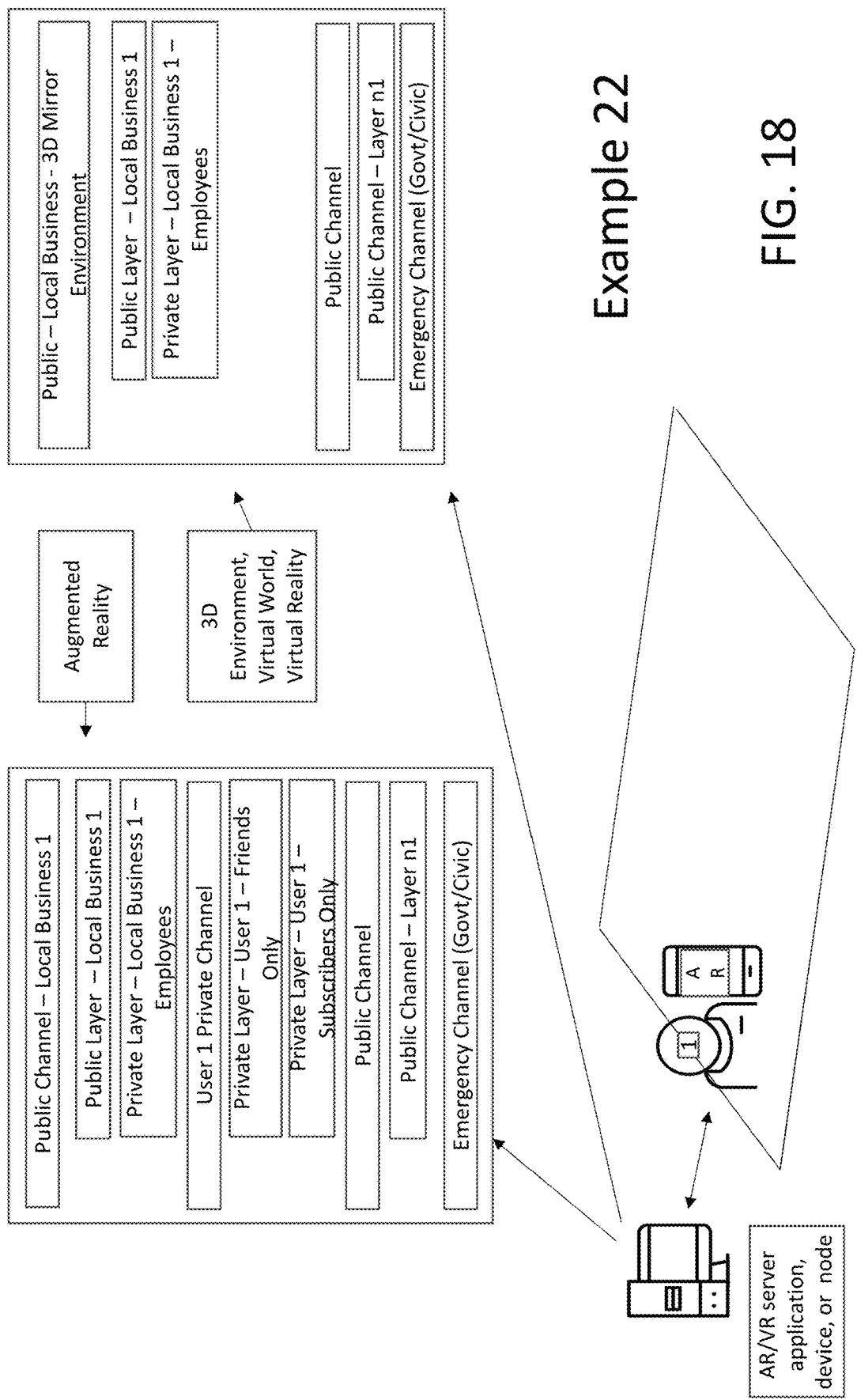
FIG. 18 is a diagram showing example use of channels and layers according to embodiments of the present disclosure.

FIG. 18 illustrates a diagram showing example use of channels and layers according to embodiments of the present disclosure.

Example 23: Channels and Layers—Multiple Locations, Linked Content

Channels and layers can be specific to a location, such as a business; or specific to a user filtering their content at one or more locations to users with access. Any content creator (individual or business) can create content (usually one or more 3D virtual objects and virtual goods individually or collectively in a scene) that is available at multiple locations, but linked to a specific channel or layer within a channel, accessible only to other users with appropriate privileges.

In one case, a user may create a scavenger hunt game, with interactive puzzles at each of several locations, for users to experience and interact with at each location once they have been given access. Granting access may occur through one or more methods including manually adding their name to an access list, or an electronic invitation sent via SMS, email, social media, or other method.

In another use case, 3D avatars (as content) may be programmed to interact with users and placed at multiple locations around a city to give a teaching experience where the avatar talks to the user in AR or VR at the location, describing the history or interesting features of the location. All of these avatars and AR content may be placed on a single channel or layer that spans multiple locations and can only be viewed and interacted with if the user has appropriate access privileges.

Localization

Localization is the process where the user has a device and an application (generally a smartphone or other device with an app) to determine their location (i.e., GPS, wifi-triangulation, beacon, etc.), then downloading or accessing the 3D mapping data for that location (from any source), then determining the position and orientation of the user and their device by analyzing the downloaded mapping data and comparing it to real-time data created by the app and computer vision techniques (standard AR methodology).

Example 24: Localization and Mapping

In an example, the user application may get their location and/or mapping data from the cloud, from an internet based server, from a server that is geolocated at or near the location (which may be a dedicated device, or any computer that is acting as the primary host for mapping data or other functionality related to AR and VR), or they may query other Users (that is, the application running on other User devices) in the vicinity that have already determined their location). Once location is determined, appropriate mapping data is downloaded (or refreshed), or created from scratch (if none previously exist), and device localization (that is the geospatial positioning and orientation) begins.

Determine initial location through GPS, cellular triangulation, wi-fi login, wi-fi triangulation, or any beacon, or sensor network. Use this data to determine which map (or set of maps) to pull from server or nearby users that may already know location and position. After accessing maps, attempt rectification and localization for position and orientation. Download additional information, 3D assets, etc.

Localization 1: Where in the world am I? Generally, GPS coordinates, or self-selection (select which of these several locations that are nearby that I am at (similar to "checking in" somewhere using Foursquare or other application).

Localization 2: What is the position and orientation of my device at the location that I am determined to be at (geo+spatial).

Localization 3: Given the above steps, display augmented reality content and media in accurate positioning through the application that I am using.

Figure 19:
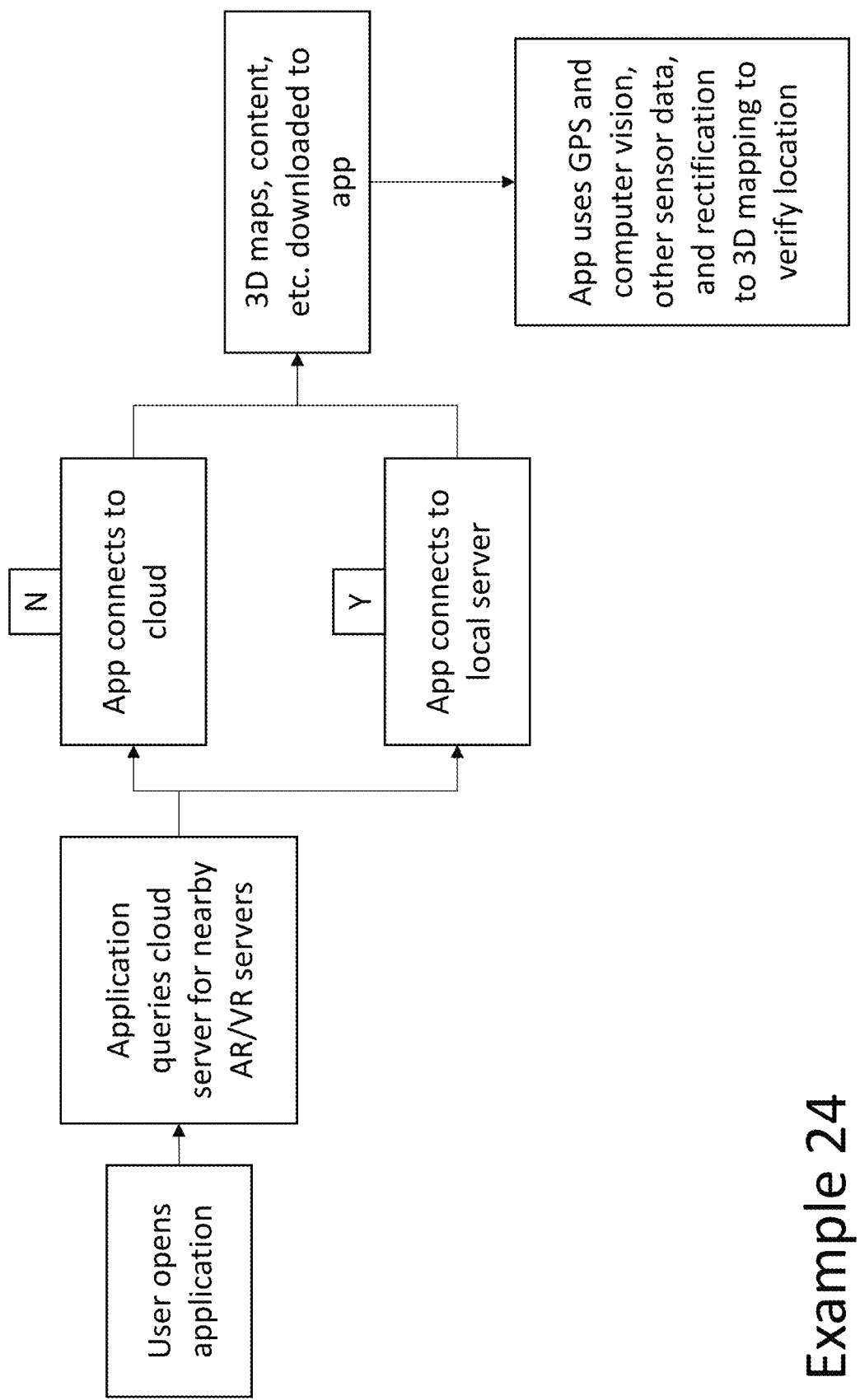
FIG. 19 is a flow diagram showing example localization and mapping according to embodiments of the present disclosure.

FIG. 19 illustrates a flow diagram showing example localization and mapping according to embodiments of the present disclosure.

Life Cycle+/−Content Curation and Moderation

Users discover and collect 3D objects (inclusive of virtual goods) using the application. These objects can be used to create interactive augmented reality and virtual reality content and scenes (placed on the User's personal channel and divided or allocated to different content layers within the channel).

Example 25: Life Cycle Content Curation and Moderation

Content on the user's personal channel (and layers) is generally persistent (permanent). However, if the user wishes to put the content on a public channel or layer for anyone to see, they must pay a fee. This fee may be based on real-money, cryptocurrency, virtual currency, or some other cost (fictional credits, energy, points, hearts, etc.). This cost/fee provides "life" to the object or scene. Life is essentially a timer until the content is removed from the public channel, marked private, and/or returned to the user's private channel or inventory of 3D objects and content. Other users can likewise select the content and pay a similar fee (as above) to either upvote and extend the life/timer for the content, or downvote it, which shortens the life/timer for the content.

The presently disclosed subject matter may handle content moderation. In this fashion, "good" content that is fun, interesting, artistic, or otherwise adds to the experience of other users in a positive or beneficial manner is extended by the local community (users must be at the location of the content to extend or shorten its life/timer), and conversely, spam, offensive content, or any content that is negative or problematic can be quickly downvoted and its life/timer shortened to force it out of the public layer.

Other features include increasing the cost for the original user to restore the content to the public channel each time it expires or is downvoted by the community to expiry. Or each user may have an overall reputation that acts as a multiplier to the fees required to upvote/downvote content. A user with a high reputation may spend a point or a dollar to upvote content, where a user with a low or bad reputation may have to spend ten dollars to balance out or negate the vote of the high reputation user.

Again, presently disclosed subject matter is part of the system of community driven content moderation based on fees, reputation, and content life cycle.

Figure 20:
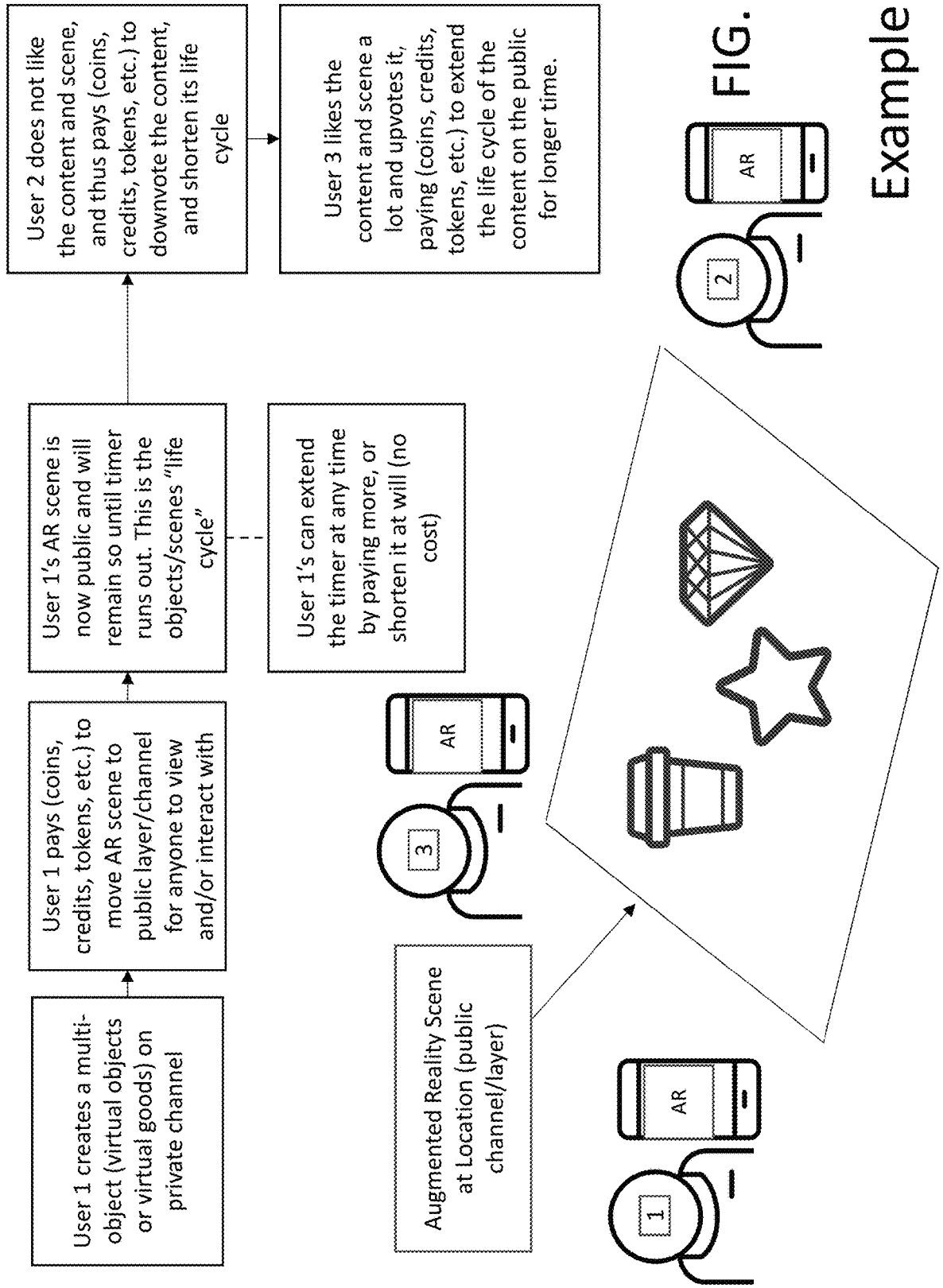
FIG. 20 is a diagram showing example life cycle+/− content curation and moderation according to embodiments of the present disclosure.

FIG. 20 illustrates a diagram showing example life cycle+/−content curation and moderation according to embodiments of the present disclosure.

Location Authentication

Users may spoof GPS location using various methods, the presently disclosed subject matter requires that authentication of the User's location be confirmed to avoid fraud, abuse of the system, etc.

Example 26: Location Authentication

In an example, the User's GPS location is one of the primary data points which determines which 3D map to download and use for localization and access of content. Once the mapping data is downloaded, the attempt to accurately determine the user's position and orientation in relation to the map is also used to verify the User's actual location. If the data acquired by the device's camera (using computer vision techniques) cannot be rectified to the location's map, then it is assumed that the user is not actually at the location, and they are unable to access any AR experiences or content.

If the application running on the user device is able to get a location (through GPS or through some other method as mentioned above) AND the software application is able to rectify position and orientation between data generated by the app and computer vision techniques using the device camera (or other sensor) and the 3D mapping data associated with the location, then it is determined that the User is actually at the location and they may then engage with the AR content at the location.

Note that this also is part of the privacy protection in accordance with embodiments of the presently disclosed subject matter. If the user is determined to not actually be at the location, they may not access any of the AR content, or access any connected device (other User, sensor, IoT device, or any other thing connected to the network at that location).

The following is supplemental information structured as user stories and additional examples.

Additional Material—User Stories and Examples

To summarize, Brands, marketers, and advertisers pay to distribute geolocal virtual goods over the network that are discoverable by consumers and redeemable for real world merchandise and special offers.

Consumers use a mobile Augmented Reality ("AR") app on their smartphone or tablet (or in the future with augmented reality wearable displays, like the Hololens or Magic Leap) to find, discover, and collect 3D objects (virtual goods) that are geolocated around the world. These objects can be used to create AR scenes that can be shared and experienced with friends or redeemed for real-world products and merchandise.

The platform is based on a network of geolocal "local node" servers hosted by users, which verifies all blockchain transactions, as well as hosting local augmented reality content and activity.

The following "user stories" describe how the different user types (brands, consumers, local node hosts) use the system and benefit.

Brands and Retail

Brands create marketing and advertising campaigns and pay to create an inventory of branded 3D objects that are collectible or that can be redeemed for free merchandise, gift cards, coupons, and other special offers.

The inventory of objects can be randomly distributed through the network at any location, or they can be targeted to generate at specific locations and times.

National Brand

Example: A global brand like Starbucks could pay for an inventory 100,000 3D coffee mugs to be randomly generated over a six-month period anywhere in the world, with another 1,000 3D gold coffee mugs (special limited edition) that can only be discovered at Starbucks locations.

The 3D coffee mugs can be redeemed by consumers for a free coffee of the day. The 3D gold coffee mugs can be redeemed for a $25 Starbucks gift card.

This campaign dramatically increases brand awareness among consumers, and the special limited-edition gold coffee mugs add a sense of prestige to the brand, as consumer traffic is driven to visit local Starbucks more often in the hopes of finding one of the rare mugs. This can also be leveraged for increased earned media and social media activity with a positive sentiment for the brand.

Because each item is unique, and the system is integrated with blockchain technology, we can provide Starbucks (or any brand) with unprecedented amounts of consumer demographics, behaviors, activity, and other interests. In addition, the tracking enables us to track every dollar spent by the brand to increased foot traffic all the way through to individual transactions, establishing and proving ROI like no other advertising or marketing method.

Local Retailer

A local retailer, in this case a Toyota car dealer, takes a slightly different approach and pays Transmira to populate the system with hundreds of objects, each related to part of a car (wheels, seats, steering wheel, body, engine, doors, license plate, etc.). Some of the objects are only discoverable at three of the owner's dealerships, one can only be obtained by scanning a QR code after taking a test drive, and the rest are randomly generated in a 100-mile radius of the dealerships.

Consumers must collect all of the objects necessary to combine into a single "car" object, which could be redeemed for a special discount or dealer rebate on the price of a new car, a gift card for a year of gas, or an entry in a contest to win a new car.

As with the coffee scenario, this would dramatically increase brand awareness of the dealership in the local area, drive foot traffic into the show room, and generate free earned media and social media activity, all in ways that can not be achieved with radio or TV commercials, or web banner ads and videos.

The Consumer

In a fashion similar to Pokémon Go, Consumers (user) use an app on their smartphone or tablet to see where virtual goods are currently available (map view for distance and live view for their location). When the user is close or within proximity of the object, they may select it on their screen and collect it.

These objects are now associated with and "located on" their mobile device. They may send the object to their account inventory (removing it from the device), sell it on a global marketplace, or trade it to a friend.

Trades to other people can be geolocal (they must be nearby within a certain radius), or gifted to a friend with a unique link sent via email, SMS, or in a future integration with other apps (Skype, Facebook messenger, etc.). In the future, instead of sending someone an emoji, they will instead send virtual goods.

These virtual goods and objects can also have a number of properties and conditions embedded. Some objects are containers (like a treasure chest or a gift box) that can hold one or more other objects and virtual goods), and some can be combined with others to create entirely new objects (such as the car components above). Conditions like "requires key to open" (yet another discoverable object) or "can only be opened on certain dates or times of day" (i.e. gift box can only be opened on user birthday or on Christmas morning) are useful for a variety of creative options for marketing and advertising campaigns and user targeting.

All of the 3D objects can be manipulated by the user to create "scenes" at a location, which is an arrangement of one or more objects that can be interacted with by other users. Some scenes are "locked" which means they cannot be picked up and added to another user's inventory (such as an art scene), while others are fair game for anyone that chooses to acquire the left behind objects. Some consumers may collect a variety of objects that may fit a certain theme for special event scenes like weddings, high school proms, parties, holidays, special events, treasure and scavenger hunt games, and much more.

Virtual Goods Pizza

How do you send someone a pizza when you don't know their address or other personal information? What if they aren't hungry right now? What if you could, and if they had the ability to save it or send it to someone else?

Example: Jim decides to treat his college daughter Suzy to pizza next week when she is studying for finals. He could send her money, but knows she might spend it on other things, and it wouldn't have the same sentiment or memory as sending her pizza.

Jim logs in to a website, creates an account, and purchases a virtual currency on the site using real dollars. He receives an amount of "credits" (the virtual currency), which he can spend on goods.

a) He enters the location of his daughter's dorm to set the location of the query he is about to do.
b) Jim enters "pepperoni pizza" into the search box, and the results are businesses local to his daughter's dorm that sell pepperoni pizza.
   a. Alternatively, the search results would simply list available virtual goods within a radius of the location that match the search term, such as pepperoni pizzas from six nearby pizza places
c) Jim selects one of the locations and chooses to see the list of virtual goods inventory. In this case, the list results are a variety of pizzas, salads, sandwiches, drinks, and desserts.
d) Jim selects pepperoni pizza, quantity three, and then purchase. He spends a set number of credits, and now owns three virtual goods pepperoni pizzas, which are listed in his account's inventory.
e) Jim then sends his daughter two of the three virtual pizzas using one of several different methods.
   a. Via email
   b. Via social network
   c. Via mobile device
   d. Other (such as directly from one account to another within a self-contained application, platform, community, game, or website)
f) All trades, transactions, gifts, and redemptions are tracked and validated by a server and require unique identifiers for all virtual goods and vouchers to minimize potential fraud.
g) Suzy receives a notification and accepts the transfer
   a. See above for options and transferal channel
h) Suzy thanks her father, and decides to save one for next week, and chooses to send the second one to her boyfriend at another dorm.
i) Later, next week, both Suzy and her boyfriend Alex get hungry and decide to activate their virtual goods and redeem them for pizza.
j) They select the virtual object (on the website or on their mobile device . . . both have shared access to the individual account inventories) and activate it (through a double click, or a right click selection, or some other method).
k) An option to select and confirm delivery for either their current location, or their registered address is given. Suzy is in the dorm, so she chooses standard address. Alex is meeting friends off campus for game night, he selects his current location.
l) The server-side software registers this activity and sends notification to the vendor that the pizzas have been ordered and paid for. Delivery instructions are included.
m) At the end of a payment cycle, the platform sends payment to the vendor for all transactions that occurred within the time period where real world goods were provided to the user/consumer.

Described above is a method where a consumer could buy goods with a virtual currency, cryptocurrency, or real money, receives a virtual object (virtual goods) that is representative of the real goods (displayed as text, 2D image, 3D object, or other media file), which can be transferred to other users, and ultimately redeemed for the real world goods, without the requirement of the sender knowing the personal information of the recipient, thus protecting privacy. This makes it possible to quickly and easily send someone real world goods in a convenient manner.

Further embodiments would include a reverse exchange where these virtual goods could be turned in and redeemed for credits (the virtual currency), and both (the goods and the currency) could be exchanged for real money.

Mapping and Multi-User

An example scenario follows:
1. User1 opens app on mobile device which activates camera. User1 pans the camera around and moves around their immediate environment.
2. Computer vision techniques are applied to the video stream to establish a ground plane/grid, and maps features such as the floor and walls, as well as surfaces like tables, etc. Moving objects are ignored and filtered out. All other objects are designated with bounding boxes.
   a. This results in
      i. a simple wireframe of buildings, windows, etc.
      ii. point cloud data (color, texture, etc.)
   b. Note: Consumer apps do not have the same requirement for accuracy as industrial or scientific applications, and "close enough" is indeed sufficient for these consumers.
3. The wireframe data is stored on the server, and used for local tracking
4. The point cloud data is used in combination with the wireframe data for a 3D reconstruction of the local environment
5. User1 can then select 3D objects from an inventory and place those objects in their local environment. The object, orientation, position, and state are all associated with the new local map and updated on the server
6. User2 opens their app, which sends a request to the server to return any maps associated with their current location (check-in, gps, etc.). Their position and orientation are used to do a quick comparison with the downloaded map and syncs. Then this is used for tracking, while any 3D content associated with the map is downloaded and displayed in the proper location.
7. User2 interacts with some of the 3D content . . . moving it around, clicking on it to trigger an animation or state change, etc. This activity is sent to the server and updates both the map, and the information related to the 3D content.
8. User1 and User3 use their apps to explore the area as well, and any changes that User2 does, is communicated to User1 and User3 by the server, updating their "scene" in near real time.

Virtual

An example scenario follows:
1. User 4 is at home and uses a browser or application to login to the servers, selects a location, and then accesses the 3D reconstruction of the area that User1 originally mapped. This may be a simple voxel scene, a basic flat-shaded polygonal scene, or a fully rendered and textured 3D environment, virtual world, or virtual reality scene. (These virtual environments are not limited to being based on mirrors of the real world, and can be completely fictional and unlimited.)
2. User4 sees basic avatar representations of User1, User2, and User3 in this environment, as they move around and their positional data is updated to the server.
3. User4 can add new objects to the scene (again from an inventory) which update the server, and User1, User2, and User3, see the new content as it is placed.

The Shop/Marketplace

An example scenario follows:
1) Users would have access to a shop that sold single instances of 3D objects. Once a 3D object is purchased, they have one unique instance of that object in their inventory
2) The initial selection of objects would be standard and by the developer (us)
3) Future selections of 3D objects would be submitted by users, and accepted through an approval queue and possibly by user community voting.
4) Virtual goods revenue!
5) Future implementations would link/associate these virtual goods with some real-world objects, i.e. a pizza which could be redeemed at Dominos for a real pizza. In this case though, instead of making it available in the shop, I would run a huge marketing campaign with dominos where 100,000 virtual 3D pizza boxes were distributed randomly in the United States (near population centers) which would have to be "discovered" by users.

In accordance with embodiments, in addition to creating/triggering virtual objects in the normal computer vision methods and placement at GPS coordinates, the system as described herein may provide for visual or audio cues (object recognition or audio "fingerprinting") that act as the trigger to generate the content (with or without a GPS/Location element). Further the virtual object can be 3D, or it can be some other content type (e.g., video, audio, web, etc. including other interactions like buttons, polls, likes, etc. For example, a M&M commercial is on TV. The application recognizes that the commercial is on (visual or audio cue/trigger recognition) and then:
a) creates virtual objects (3D animated M&M characters popping out of the screen)
b) displays a poll, survey, link, website, video, audio, etc (which is further customized to the user, so multiple users in the same room may get different content)
c) displays a "buy now" button, enabling instant purchase of whatever is displayed on the TV, monitor, billboard, sign, other smartphone or tablet, etc. (including broadcast, streaming, stored/saved content, image (i.e logo, photo, instagram post, twitter post, etc.)

For example, two users are watching a commercial on TV. The application on the devices recognizes it as a specific commercial and triggers content on each of the devices. User 1 gets a 3D virtual object, and User 2 gets another commercial (video clip) from a competing brand "piggybacking" their content on the original commercial, using it to trigger the experience.

The key points to add here are 1) devices and displays to include wearable displays (such as the Microsoft Hololens or the Magic leap; 2) triggering content from visual, audio, or sensors; 3) content is customized to the user and may be anything from a 3D virtual good to a link (i.e. a buy-now button linked to Amazon or to a website like factcheck.org); and 4) interfaces that may be computer vision or sensor based without hardware (such as a keyboard, pointer, etc.)

The various techniques described herein may be implemented with hardware or software or, where appropriate, with a combination of both. For example, the computing devices disclosed herein may include suitable hardware, software, or combinations thereof configured to implement the various techniques described herein. The methods and apparatus of the disclosed embodiments, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the presently disclosed subject matter. In the case of program code execution on programmable computers, the computer will generally include a processor, a storage medium readable by the processor (including volatile and non-volatile memory and/or storage elements), at least one input device and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The described methods and apparatus may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the presently disclosed subject matter. When implemented on a general-purpose processor, the program code combines with the processor to provide a unique apparatus that operates to perform the processing of the presently disclosed subject matter.

While the embodiments have been described in connection with the preferred embodiments of the various figures, it is to be understood that other similar embodiments may be used or modifications and additions may be made to the described embodiment for performing the same function without deviating therefrom. Therefore, the disclosed embodiments should not be limited to any single embodiment, but rather should be construed in breadth and scope in accordance with the appended claims.

What is claimed:

1. A system comprising:
a display;
a user interface;
a video camera or still camera configured as an image capture device; and
at least one processor and memory configured to:
create a virtual object, define and embed a unique identifier of said virtual object within a definition of said virtual object, link said virtual object to a real-world item, and make said virtual object available to one or more users;
receive a coordinate for placement of said virtual object in a digital environment;
control the display to display the virtual object when a position corresponding to the received coordinate is within a field of view of said image capture device;
receive an input via the user interface for selecting the virtual object; and
in response to receipt of the input, associate with a user a credit for transaction or transfer of said virtual object to a computing device of a different user; and
associate with a user the credit associated with the at least one virtual object for acquisition of the real-world item linked with the virtual object.

2. The system of claim 1, wherein the credit is for acquisition of a real-world item or service that is linked with said virtual object.

3. The system of claim 1, wherein the credit is transferable to another computing device.

4. The system of claim 1, further comprising one or more computing devices that include the display, the user interface, the image capture device, and the at least one processor and memory.

5. The system of claim 4, wherein at least one of the computing devices comprises one of a smartphone, a tablet computer, a smart watch, and a desktop computer.

6. The system of claim 1, wherein the virtual object is a visual representation of the item.

7. The system of claim 1, wherein said real-world item comprises one of an object, service, and an offer.

8. The system of claim 1, wherein the at least one processor and memory is configured to:
receive a unique identifier upon the selection of the virtual object; and
use the unique identifier to conduct a transaction for acquisition of the real-world item.

9. The system of claim 1, further comprising a first computing device and a second computing device,
wherein the first computing device comprises the display, the user interface, the image capture device, and the at least one processor and memory, and
wherein the first computing device is configured to communicate a unique identifier to the second computing device for use in acquiring the item.

10. The system of claim 1, further comprising a computing device configured to interact with the at least one processor and memory for conducting a purchase transaction for the said real-world item in exchange for the credit.

11. The system of claim 1, further comprising a computing device configured to:
maintain a database that associates the virtual object with the coordinate; and
communicate, to the at least one processor and memory, the coordinate and information about the virtual object.

12. The system of claim 11, wherein the computing device is configured to:
determine that the credit has been used for acquisition of the real-world item associated with the virtual object; and
update the database to remove the virtual object from the digital environment in response to determining that the credit has been used for acquisition of the real-world item.

13. The system of claim 12, wherein the computing device is configured to communicate, to the at least one processor and memory, an indication that the virtual object is removed from the digital environment.

14. The system of claim 12, wherein the computing device is configured to utilize a blockchain technique for managing the virtual object and its associated data.

15. The system of claim 12, wherein the computing device is communicatively connected to the at least one processor and memory via the Internet.

16. The system of claim 12, wherein the computing device is communicatively connected to the at least one processor and memory via a local area network.

17. A system comprising:
a server comprising:
an input/output processor comprising a communications module configured to communicate with other computing devices via a network;
one or more data processors and computer memory in said server comprising an augmented reality manager configured to:
create a virtual object, define and embed a unique identifier of said virtual object within a definition of said virtual object, link said virtual object to a real-world item, and make said virtual object available to one or more users;
maintain a database that identifies a plurality of virtual objects and a coordinate of each of the virtual objects in a digital environment;
associate, for each virtual object, a credit for transaction or transfer; and
communicate, to the other computing devices via the network, identification of at least one virtual object and the coordinate of the at least one virtual object;
said server configured to:
receive data comprising the control of a display to display the at least one virtual object when a position corresponding to the received coordinate is within a field of view of an image capture device;
receive an input via a user interface for selecting the virtual object; and
in response to receipt of the input, associate with a user the credit associated with the at least one virtual object for acquisition of the real-world item linked with the virtual object.

18. The system of claim 17, wherein the credit is for acquisition of said real-world item or service.

19. The system of claim 17, wherein the credit is transferable to another computing device.

20. The system of claim 17, wherein each of said other computing devices are configured to:
receive the coordinate for placement of the at least one virtual object in the digital environment;

control a display to display the at least one virtual object when a position corresponding to the received coordinate is within a field of view of an image capture device;
receive an input via a user interface for selecting the virtual object; and
in response to receipt of the input, associate with a user the credit associated with the at least one virtual object for acquisition of the real-world item associated with the virtual object.

21. The system of claim 17, wherein each of the other computing devices comprises one of a smartphone, a tablet computer, a smart watch, and a desktop computer.

22. The system of claim 17, wherein the at least one virtual object is a visual representation of the real-world item associated with the at least one virtual object.

23. The system of claim 17, wherein the real-world item associated with the at least one virtual object comprises one of an object, service, and an offer.

24. The system of claim 17, wherein the augmented reality manager is configured to:
receive an indication that one of the other computing devices was used to select the at least one virtual object; and
communicate, to the one of the other computing devices, a unique identifier for use in conducting a transaction for acquisition of the real-world item.

25. The system of claim 17, wherein the augmented reality manager is configured to:
determine that the credit has been used for acquisition of the real-world item associated with the at least one virtual object; and
update the database to remove the at least one virtual object from the digital environment in response to determining that the credit has been used for acquisition of the real-world item.

26. The system of claim 25, wherein the augmented reality manager is configured to use the communications module to communicate, to one or more of the other computing devices, an indication that the at least one virtual object is removed from the digital environment.

27. The system of claim 17, wherein the augmented reality manager is configured to utilize a blockchain technique for managing the virtual objects and the coordinates of the virtual objects in the digital environment.

28. The system of claim 17, wherein the network comprises the Internet.

29. The system of claim 17, wherein the network comprises a local area network.

30. A method comprising:
receiving a coordinate for placement of a virtual object in a digital environment;
creating said virtual object, defining and embedding a unique identifier of said virtual object within a definition of said virtual object, linking said virtual object to a real-world item, and making said virtual object available to one or more users;
controlling a display to display the virtual object when a position corresponding to the received coordinate is within a field of view of a video or still camera configured as an image capture device;
receiving an input via a user interface for selecting the virtual object; and
in response to receipt of the input, associating with a user a credit for transaction or transfer.

31. The method of claim 30, wherein the credit is for acquisition of a real-world item or service.

32. The method of claim 30, wherein the credit is transferable to another computing device.

33. The method of claim 30, wherein the virtual object is a visual representation of the real-world item.

34. The method of claim 30, wherein the real-world item comprises on of an object, service, and an offer.

35. The method of claim 30, further comprising:
receiving a unique identifier upon the selection of the virtual object; and
using the unique identifier to conduct a transaction for acquisition of the real-world item.

36. The method of claim 30, further comprising:
maintaining a database that associates the virtual object with the coordinate; and
communicating, to a computing device, the coordinate and information about the virtual object.

37. The method of claim 36, further comprising:
determining that the credit has been used for acquisition of the item associated with the virtual object; and
updating the database to remove the virtual object from the digital environment in response to determining that the credit has been used for acquisition of the real-world item.

38. The method of claim 36, further comprising communicating, to the computing device, an indication that the virtual object is removed from the digital environment.

39. The method of claim 36, further comprising utilizing a blockchain technique for managing the virtual object and its associated data.

40. A method comprising:
maintaining a database that identifies a plurality of virtual objects and a coordinate of each of the virtual objects in a digital environment;
associating, for each virtual object, a credit for transaction or transfer;
creating said virtual object within a definition of said virtual object, linking said virtual objects to real-world items, and making said virtual objects available to one or more users;
communicating, to a plurality of computing devices via a network, identification of at least one virtual object, and the coordinate of the at least one virtual object;
receiving data comprising the control of a display to display the at least one virtual object when a position corresponding to said coordinate of the at least one virtual object is within a field of view of an image capture device;
receiving an input via a user interface for selecting the at least one virtual object; and
in response to receipt of the input, associating with a user the credit associated with the at least one virtual object for acquisition of the item linked with the at least one virtual object.

41. The method of claim 40, wherein the credit is for acquisition of a real-world item or service.

42. The method of claim 40, wherein the credit is transferable to another one of said plurality of computing devices.

43. The method of claim 40, further comprising at each of the other computing devices:
receiving the coordinate for placement of the at least one virtual object in the digital environment;
controlling a display to display the at least one virtual object when a position corresponding to the received coordinate is within a field of view of an image capture device;

receiving an input via a user interface for selecting the virtual object; and in response to receipt of the input, associating with a user the credit associated with the at least one virtual object for acquisition of the real-world item associated with the virtual object.

44. The method of claim 40, wherein the at least one virtual object is a visual representation of the item associated with the at least one virtual object.

45. The method of claim 40, wherein the real-world item associated with the at least one virtual object comprises one of an object, service, and an offer.

46. The method of claim 40, further comprising:

receiving an indication that one of the other computing devices was used to select the at least one virtual object; and communicating, to the one of the other computing devices, a unique identifier for use in conducting a transaction for acquisition of the real-world item.

47. The method of claim 40, further comprising:

determining that the credit has been used for acquisition of the item associated with the at least one virtual object; and updating the database to remove the at least one virtual object from the digital environment in response to determining that the credit has been used for acquisition of the real-world item.

48. The method of claim 47, further comprising using the communications module to communicate, to one or more of the other computing devices, an indication that the at least one virtual object is removed from the digital environment.

49. The method of claim 40, further comprising utilizing a blockchain technique for managing the virtual objects and the coordinates of the virtual objects in the digital environment.

50. The method of claim 40, wherein the network comprises the Internet.

51. The method of claim 40, wherein the network comprises a local area network.

* * * * *